(12) United States Patent
Nicol

(10) Patent No.: US 6,882,711 B1
(45) Date of Patent: Apr. 19, 2005

(54) PACKET BASED NETWORK EXCHANGE WITH RATE SYNCHRONIZATION

(75) Inventor: Jordan James Nicol, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/454,219

(22) Filed: Dec. 9, 1999

Related U.S. Application Data

(60) Provisional application No. 60/166,289, filed on Nov. 18, 1999, provisional application No. 60/164,690, filed on Nov. 10, 1999, provisional application No. 60/157,470, filed on Nov. 10, 1999, provisional application No. 60/164,379, filed on Nov. 9, 1999, provisional application No. 60/163,600, filed on Nov. 4, 1999, provisional application No. 60/163,170, filed on Nov. 2, 1999, provisional application No. 60/163,169, filed on Nov. 2, 1999, provisional application No. 60/162,315, filed on Oct. 28, 1999, provisional application No. 60/161,152, filed on Oct. 22, 1999, provisional application No. 60/160,124, filed on Oct. 18, 1999, provisional application No. 60/157,470, filed on Oct. 1, 1999, provisional application No. 60/156,266, filed on Sep. 27, 1999, and provisional application No. 60/154,903, filed on Sep. 20, 1999.

(51) Int. Cl.$^7$ .............................................. H04M 11/00
(52) U.S. Cl. ............................... 379/93.33; 379/90.01; 379/100.17
(58) Field of Search ........................... 379/93.33, 90.01, 379/93.07, 93.31, 93.08, 100.14, 100.17; 370/352, 465, 468, 433, 435

(56) References Cited

U.S. PATENT DOCUMENTS

| 4,285,060 A | 8/1981 | Cobb et al. |
| 5,119,322 A | 6/1992 | Stroobach |
| 5,329,587 A | 7/1994 | Morgan et al. |

(Continued)

OTHER PUBLICATIONS

WO 97/28628, Lin et al, Hybrid Network for real–time phone–to–phone voice communication, Aug. 1997.*
WO 97/26753, Wilkes et al. , Facsimile Internet transmission System, Jul. 1997.*
International Telecommunication Union, ITU–T Telecommunication Standardization Sector of ITU, Data Communication Over the Telephone Network, "300 Bits Per Second Duplex Modem Standardized For Use in The General Switched Telephone Network," ITU–T Recommendation, 1988, 1993, 7 pages, V. 21, ITU.
International Telecommunication Union, CCITT—The International Telegraph and Telephone Consultative Committee, Data Communication Over the Telephone Network, "A2–Wire Modem for Facsimile Applications With Rates up to 14 400 bit's" Recommendation, 1991, 13 pages, V. 17, ITU, Geneva.

(Continued)

*Primary Examiner*—Melur Ramakrishnaiah
(74) *Attorney, Agent, or Firm*—Christie, Parker & Hale, LLP

(57) ABSTRACT

A signal processing system which discriminates between voice signals and data signals modulated by a voiceband carrier. The signal processing system includes a voice exchange, a data exchange and a call discriminator. The voice exchange is capable of exchanging voice signals between a circuit switched network and a packet based network. The signal processing system also includes a data exchange capable of exchanging data signals modulated by a voiceband carrier on the circuit switched network with unmodulated data signal packets on the packet based network. The data exchange is performed by demodulating data signals from the circuit switched network for transmission on the packet based network, and re-modulating data signal packets from the packet based network for transmission on the circuit switched network. The call discriminator is used to selectively enable the voice exchange and data exchange.

25 Claims, 14 Drawing Sheets

U.S. PATENT DOCUMENTS

| | | | |
|---|---|---|---|
| 5,353,346 A | | 10/1994 | Cox et al. |
| 5,388,127 A | | 2/1995 | Scarpa |
| 5,454,015 A | | 9/1995 | Olafsson |
| 5,491,565 A | | 2/1996 | Naper |
| 5,535,271 A | | 7/1996 | Jangi et al. |
| 5,598,468 A | | 1/1997 | Ammicht et al. |
| 5,694,517 A | * | 12/1997 | Sugino et al. .............. 395/2.17 |
| 5,790,641 A | | 8/1998 | Chan et al. |
| 5,793,498 A | | 8/1998 | Scholl et al. ................ 358/434 |
| 5,805,301 A | * | 9/1998 | Rasanen ...................... 358/425 |
| 5,818,929 A | | 10/1998 | Yaguchi |
| 5,852,630 A | | 12/1998 | Langberg et al. |
| 5,859,671 A | | 1/1999 | Kim |
| 5,970,441 A | * | 10/1999 | Mckuria ...................... 204/207 |
| 5,987,061 A | * | 11/1999 | Chen ........................... 375/222 |
| 6,023,470 A | * | 2/2000 | Lee et al. .................... 370/401 |
| 6,028,679 A | | 2/2000 | Murphy ....................... 358/407 |
| 6,125,177 A | | 9/2000 | Whittaker |
| 6,141,341 A | * | 10/2000 | Jones et al. .................. 370/352 |
| 6,151,636 A | * | 11/2000 | Schuster et al. ............ 709/247 |
| 6,233,226 B1 | | 5/2001 | Gringeri et al. |
| 6,259,677 B1 | | 7/2001 | Jain |
| 6,353,610 B1 | * | 3/2002 | Bhattacharya et al. ...... 370/352 |

OTHER PUBLICATIONS

International Telecommunication Union, ITU–T—Telecommunication Standardization Sector of ITU, Series T: Terminal Equipments and Protocols for Telematic Services, "Procedures for Document Facsimile Transmission in the General Switched Telephone Network," ITU–T Recommendation, Jul. 1996, 74 pages, T.30, ITU.

International Telecommunication Union, ITU–T Telecommunication Standardization Sector of ITU, Data Communication Over the Telephone Network, "9600 Bits Per Second Modem Standardized For Use On Point–To–Point 4–Wire Leased Telephone–Type Circuits," ITU–T Recommendation, 1988, 1993, 17 pages, V. 29, ITU.

International Telecommunication Union, ITU–T Telecommunication Standardization Sector of ITU, Data Communication Over the Telephone Network, "Error Correcting Procedures for DCEs Using Asynchronous–To–Synchronous Conversion," ITU–T Recommendation, Mar. 1993, 78 pages, V. 42, ITU.

International Telecommunication Union, ITU–T Telecommunication Standardization Sector of ITU, Data Communication Over the Telephone Network, "4800/2400 Bits Per Second Modem Standardized For Use in The General Switched Telephone Network," ITU–T Recommendation, 1988, 1993, 15 pages, V.27 ter, ITU.

International Telecommunication Union, CCITT The International Telegraph and Telephone Consultative Committee, Data Communication Over the Telephone Network, "Data Compression Procedures For Data Circuit Terminating Equipment (DCE) Using Error Correction Procedures," ITU–T Recommendation, 1990, 29 pages, V.42 bis, ITU.

International Telecommunication Union, ITU–T Telecommunication Standardization Sector of ITU, Series T: Terminal Equipments and Protocols for Telematic Services, "Standardization of Group 3 Facsimile Terminals for Document Transmission," ITU–T Recommendation, Jul. 1996, 61 pages, T.4, ITU.

International Telecommunication Union, ITU–T Telecommunication Standardization Sector of ITU, Series V: Data Communication Over the Telephone Network, Simultaneous Transmission of Data and Other Signals, "A Digital Modem and Analogue Modem Pair For Use on the Public Switched Telephone Network (PSTN) at Data Signalling Rates of up to 56 000 bit/s Downstream and up to 33 600 bit/s Upstream," ITU–T Recommendation, Sep. 1998, 49 pages, V.90, ITU.

IEEE; IEEE Standards for Local and Metropolitan Area Networks: Supplement to Carrier Sense Multiple Access with Collision Detection (CSMA/CD) Access Method and Physical Layer Specifications, Media Access Control (MAC) Parameters, Physical Layer, Medium Attachment Units, and Repeater for 100 Mb/s Operation, Type 100BASE–T (Clauses 21–30); June 14, 1995, 408 pages, IEEE std 802.3u–1995 (Supplement to ISO–IEC 8802–3: 1993 [ANSI/IEEE Std 802.3, 1993 Edition]), The Institute of Electrical and Electronics Engineers, Inc., New York, NY.

Fuyun Ling and Shahid Qureshi, "Convergence and Steady–State Behavior of a Phase–Splitting Fractionally Spaced Equalizer,"IEEE Transactions on Communications, Apr. 4, 1990, pp. 418–425, vol. 38, No. 4, IEEE.

Paul Fischer, "State Machines In C," The C Users Journal, Dec. 1990, pp. 119–122.

U.S. Appl. No. 09/639,527, filed Aug. 16, 2000, Jordan James Nicol.

U.S. Appl. No. 09/493,458, filed Jan. 28, 2000, Henry Li.

U.S. Appl. No. 09/643,920, filed Aug. 23, 2000, Onur Tackin et al.

U.S. Appl. No. 09/692,554, filed Oct. 19, 2000, Wilf Le Blanc et al.

U.S. Appl. No. 09/644,586, filed Aug. 23, 2000, Henry Li.

U.S. Appl. No. 09/643,921, filed Aug. 23, 2000, Wilf Le Blanc et al.

U.S. Appl. No. 09/653,261, filed Aug. 31, 2000, Onur Tackin et al.

U.S. Appl. No. 09/654,376, filed Sep. 1, 2000, Onur Tackin.

U.S. Appl. No. 09/533,022, filed Mar. 22, 2000, Wilf Le Blanc et al.

U.S. Appl. No. 09/697,777, filed Oct. 26, 2000, Wilf Le Blanc et al.

U.S. Appl. No. 09/651,006, filed Aug. 29, 2000, Kenny C. Kwan.

U.S. Appl. No. 09/522,184, filed Mar. 9, 2000, Henry Li et al.

R. W. Lucky, *QAM Receiver I. General Description of Complete Receiver Block Diagram and Details of the Symbol Clock Recovery and Other Front–End Subsystems*, Applications of Communications Theory, Chapter 13, pp. 127–135, Bellcore.

R. W. Lucky, *QAM Receiver II. The Passband Adaptive Equalizer and Carrier Recovery System*, Applications of Communications Theory, Chapter 14, pp. 137–151, Bellcore.

Edward A. Lee et al., *Adaptive Equalization*, Digital Communication, Chapter 9, pp. 371–402.

Edward A. Lee et al., *Timing Recovery*, Digital Communication, Chapter 15, pp. 560–582.

William Webb et al., *Basic Equaliser Techniques*, Modern Quadrature Amplitude Modulation, Principles and Applications for Fixed and Wireless Communications, IEEE Press, New York, Chapter 7, pp. 197–211.

Mike Gray, *FAX Technology Tutorial and Testing Issues*, Agilent Technologies, © 2000, pp. 1–20.

*FAX Over IP Opportunities and Options*, Natural MicroSystems, 7 sheets.

EIA/TIA–464–B, Requirements for Private Branch Exchange (PBX) Switching Equipment, "6 Signaling Requirements, 6.1 Network Signaling—Analog," pp. 140–146.

Man Mohan Sondhi et al., *Silencing Echoes on the Telephone Network*, Proceedings of the IEEE, © Aug. 1980, vol. 68, No. 8, pp. 948–963.

John G. Proakis, *Digital Signaling Over a Channel With Intersymbol Interference*, Digital Communications, ISBN 0–07–05097–1, © 1983, pp. 357–381, McGraw–Hill, Inc.

Bell Communications Research, *Dual–Tone Multifrequency Receiver Generic Requirements for End–to–End Signaling Over Tandem–Switched Voice Links*, © Mar. 1987, Technical Reference TR–TSY–000181 Issue 1, 11 sheets.

Bell Communications Research, *Impulse Noise Tape No. 201*, Technical Reference TR–TSY–000762 Issue 1, © Jul. 1987, 4 sheets.

Bell Communications Research, *Digit Simulation Test Tape*, Technical Reference TR–TSY–000763 Issue 1, © Jul. 1987, 6 sheets.

John A.C. Bingham, *Timing Recovery*, The Theory and Practice of Modem Design, © 1988, Chapter 7, pp. 189–236, John Wiley & Sons, Inc.

John A.C. Bingham, *Linear Adaptive Equalizers*, The Theory and Practice of Modem Design, © 1988, Chapter 8, pp. 237–252, John Wiley & Sons, Inc.

International Telecommunication Union, ITU–T Telecommunication Standardization Sector of ITU, General Aspects of Digital Transmission Systems, Terminal Equipments, *Pulse Code Modulation (PCM) of Voice Frequencies*, ITU–T Recommendation, G. 711; © ITU1988; 1993; 8 sheets.

International Telecommunication Union, ITU–T Telecommunication Standardization Sector of ITU, Transmission Systems and Media, Apparatus Associated With Long–Distance Telephone Circuits and Other Terminal Equipments, *Echo Suppressors*, ITU–T Recommendation, G. 164; © ITU 1988, 1993; 36 sheets.

International Telecommunication Union, ITU–T Telecommunication Standardization Sector of ITU, General Aspects of Digital Transmission Systems, Terminal Equipments, *7 kHz Audio–Coding Within 64 Kbit/s*, ITU Recommendation; G. 722; © ITU 1988, 1993; 76 sheets.

International Telecommunications Union, ITU–T Telecommunication Standardization Sector of ITU, General Recommendations On Telephone Switching and Signalling, International Automatic and Semi–Automatic Working, *Technical Features of Push–Button Telephone Sets*, ITU–T Recommendation; Q 23; © ITU 1988, 1993, 4 sheets.

International Telecommunication Union, ITU–T Telecommunication Standardization Sector of ITU, General Recommendations on Telephone Switching and Signalling, International Automatic and Semi–Automatic Working, *Multifrequency Push–button Signal Reception*, ITU–T Recommendation, Q. 24, © ITU 1988, 1993, 7 sheets.

International Telecommunication Union, CCITT The International Telegraph and Telephone Consultative Committee, General Aspects of Digital Transmission Systems; Terminal Equipments, *40, 32, 24, 16 kbit/s Adaptive Differential Pulse Code Modulation (ADPCM)*, ITU–T Recommendation, G.726; © 1990; 59 sheets.

International Telecommunication Union, CCITT The International Telegraph and Telephone Consultative Committee, General Aspects of Digital Transmission Systems; Terminal Equipments, *5–, 4–, 3–And 2–bits Sample Embedded Adaptive Differential Pulse Code Modulation (ADPCM)*; Recommendation G. 727; © ITU 1990; 57 sheets.

Dennis R. Morgan et al., AT & T Bell Laboratories; *A Multi–Tone Pseudo–Cascade Filtered–X LMS Adaptive Notch Filter*, Proceedings of the IEEE International Conference in Acoustic Speech and Signal Processing, ICASSP 91, vol. 3 D, May 1991, Toronto, Ontario, Canada, pp. 2093–2096.

Panos E. Papamichalis, Texas Instruments, Inc., *Practical Approaches to Speech Coding*, Prentice–Hall, Inc., Englewood Cliffs, New Jersey; 1992, pp. 163–167.

James Thi et al., AT & T Bell Laboratories; *A Broadband Pseudo–Cascade Active Control System*, Proceeding of the IEEE International Conference in Acoustic Speech and Signal Processing; © 1992 IEEE; pp. II–233–II–236.

International Telecommunication Union, ITU–T Telecommunication Standardization Sector of ITU; General Aspects of Digital Transmission Systems; Terminal Equipments, *Coding of Speech at 16 kbit/s Using Low–delay Code Excited Linear Prediction*, Recommendation G. 728; Sep. 1992, 65 sheets.

Dennis R. Morgan et al., AT & T Bell Laboratories, *A Multitone Pseudocascade Filtered–X LMS Adaptive Notch Filter*, IEEE Transactions on Signal Processing, vol. 41, No. 2; © Feb. 1993; pp. 946–956.

International Telecommunication Union, ITU–T Telecommunication Standardization Sector of ITU, General Characteristics of International Telephone Connections and International Telephone Circuits, *Echo Cancellers*, ITU–T Recommendation G. 165; © ITU 1994; 31 sheets.

Gardner et al.; Qualcomm Inc.; *QCELP: A Variable Rate Speech Coder for CDMA Digital Cellular*, © 1993 by Kluwer Academic Publishers; Second Printing 1995; 9 sheets.

International Telecommunication Union ITU–T Telecommunication Standardization Sector of ITU, General Aspects of Digital Transmission Systems, *Coding of Speech at 16 kbit/s Using Low–Delay Code Excited Linear Prediction*, Annex G: 16 kbit/s Fixed Point Specification, ITU–T Recommendation G.728—Annex G; © ITU 1995; 67 sheets.

Dennis R. Morgan et al., *A Delayless Subband Adaptive Filter Architecture*, IEEE Transactions on Signal Processing; vol. 43, No. 8; © Aug. 1995, pp. 1819–1830.

Internet Papers: Schulzrinne H.; *RTP Profile for Audio and Video Conferences with Minimal Control*, Network Working Group Request for Comments: 1890; http://www.cis.ohio–state.edu/cgi–bin/rfc/rfc1890.html; Jan. 1996; 15 sheets.

International Telecommunication Union, ITU–T Telecommunication Standardization Sector of ITU, General Aspects of Digital Transmission Systems, *Dual Rate Speech Coder For Multimedia Communications Transmitting at 5.3 and 6.3 kbit/s*; ITU–T Recommendation G. 723.1; © ITU 1996; 31 sheets.

International Telecommunication Union ITU–T Telecommunication Standardization Sector of ITU, General Aspects of Digital Transmission Systems, *Coding of Speech at 8 kbit/s Using Conjugate–Structure Algebraic–Code–Excited Linear–Prediction (CS–ACELP)*; ITU–T Recommendation G.729; © ITU 1996; 38 sheets.

Bellcore Bell Communication Research, Generic Requirements GR–506–CORE, *LSSGR: Signaling for Analog Interfaces*, (A Module of LSSGR, FR–64); Issue 1; © Jun. 1996; 240 sheets.

International Telecommunication Union, ITU–T Telecommunication Standardization Sector of ITU, Series G: Transmission Systems and Media, Digital Transmission Systems—Terminal Equipments—Coding of Analogue Signals By Methods Other Than PCM, *Dual Rate Speech Coder for Multimedia Communications Transmitting at 5.3 and 6.3 kbit/s, Annex A: Silence Compression Scheme*; ITU–T Recommendation G.723.1—Annex A; © ITU 1997; 22 sheets.

International Telecommunication Union, ITU–T Telecommunication Standardization Sector of ITU, Series G: Transmission Systems and Media, Digital Transmission Systems—Terminal Equipments—Coding of Analogue Signals by Methods Other Than PCM, Coding of Speech at 8 kbit/s Using Conjugate Structure Algebraic–Code–Excited Linear– Prediction (CS–ACELP), Annex B: A Silence Compression Scheme For G.729 Optimized for Terminals Conforming to Recommendation V.70, ITU–T Recommendation G.729—Annex B; © ITU 1997; 23 sheets.

International Telecommunication Union, ITU–T Telecommunication Standardization Sector of ITU, Series G: Transmission Systems and Media, Digital Transmission Systems—Terminal Equipments—Coding of Analogue Signals by Methods Other Than PCM, *Coding of Speech at 8 kbit/s Using Conjugate Structure Algebraic–Code–Excited Linear–Prediction (CS–ACELP) Annex A: Reduced Complexity 8 kbit/s CS–ACELP Speech Codec*, ITU–T Recommendation G.729—Annex A; © ITU 1997; 15 sheets.

European Telecommunication Standard, *Digital Cellular Telecommunications System; Half Rate Speech; Voice Activity Detector (VAD) for Half Rate Speech Traffic Channels (GSM 06.42 version 5.0.1)*; Source ETS; TC–GSM; Reference DE/SMG–110642Q; © 1997; 21 sheets.

International Telecommunication Union, ITU–T, Telecommunication Standardization Sector of ITU, Series I: Integrated Services Digital Network, Overall Network Aspects and Functions—Protocol Layer Requirements, *B–ISDN ATM Adaptation Layer Specification: Type 2 AAL*, ITU–T Recommendation I.363.2; © 1998; 47 sheets.

Internet Papers: Perkins et al.; *RTP Payload for Redundant Audio Data*; Network Working Group Request for Comments: 2198; http://www.cis.ohio–state.edu/cgi–bin/rfc/rfc2198.html; Sep. 1997; pp. 1–9.

Internet Papers: Schulzrinne, "RTP Profile for Audio and Video Conferences with Minimal Control," Internet Engineering Task Force, Internet Draft; http:// hegel.ittc.ukans.edu/topics/internet/internet–drafts/draft–i/draft–ietf–avt–profile–new–C..; Nov. 20, 1997; pp. 1–29.

IMTC Voice over IP Forum Technical Committee, "IMTC Voice over IP Forum Service Interoperability Implementation Agreement 1.0," Dec. 1, 1997, VoIP97–061; pp. 1–44.

Edward B. Morgan, Fax Over Packet; Telogy Networks, Inc., Germantown, Maryland; © 1998; pp. 1–12.

International Telecommunication Union, ITU–T Telecommunication Standardization Sector of ITU, Series V: Data Communication Over The Telephone Network, *A Modem Operating at Data Signalling Rates of up to 33 600 bit/s for Use on the General Switched Telephone Network and on Leased Point–to–Point 2–Wire Telephone–Type Circuits*; ITU–T Recommendation V. 34; © ITU 1998; 78 sheets.

International Telecommunication Union, ITU–T Telecommunication Standardization Sector of ITU, Series T: Terminals for Telematic Services, *Procedures for Real Time Group 3 Facsimile Communication Over IP Networks*, ITU–T Pre–published Recommendation T. 38; © ITU 1998; 32 sheets.

Frame Relay Forum Technical Committee, *Voice over Frame Relay Implementation Agreement;* © 1998; 54 sheets.

International Telecommunication Union, ITU–T Telecommunication Standardization Sector of ITU, Series I: Integrated Services Digital Network, Overall Network Aspects and Functions—Protocol Layer Requirements, *AAL Type 2 Service Specific Convergence Sublayer For Trunking*; ITU–T Recommendation I.366.2; © ITU 1999; 96 sheets.

International Telecommunication Union, ITU–T Telecommunication Standardization Sector of ITU, Series G: Transmission Systems and Media, Digital Systems and Networks, *Automatic Level Control Devices*: ITU–T Recommendation G.169; © ITU 1999; pp. 1–52.

Internet Papers: Schulzrinne et al.; *RTP Protocol for DTMF Digits, Telephony Tones and Telephony Signals*; Network Working Group Request for Comments: 2833; © The Internet Society 2000; 31 sheets.

International Telecommunication Union, ITU–T Telecommunication Standardization Sector of ITU, Series G: Transmission Systems and Media, Digital Systems and Networks, International Telephone Connections and Circuits—Apparatus Associated With Long–Distance Telephone Circuits, *Digital Network Echo Cancellers*; ITU–T Recommendation G. 168; © ITU 1997; 95 sheets.

ETSI EN 300 973, Global System for Mobile Communications, *Digital cellular telecommunications system (Phase 2+); Half rate speech; Voice Activity Detector (VAD) for half rate speech traffic channels*; GSM 06.42 version 8.0.1 Release 1999); © 2000; pp. 1–22.

* cited by examiner

PACKET BASED NETWORK EXCHANGE WITH RATE SYNCHRONIZATION

CROSS-REFERENCE TO RELATED APPLICATIONS

The present application claims priority under 35 U.S.C. § 119(e) to the following provisional applications: Ser. No. 60/164,689, filed on Nov. 10, 1999; Ser. No. 60/157,470, filed on Oct. 1, 1999; Ser. No. 60/156,266, filed on Sep. 27, 1999; and Ser. No. 60/154,903, filed on Sep. 20, 1999. All these applications are expressly incorporated by reference herein as though set forth in full. The present application also claims priority under 35 U.S.C. §119(e) to the following provisional applications: application Ser. No. 60/160,124, filed Oct. 18, 1999; application Ser. No. 60/161,152, filed Oct. 22, 1999; application Ser. No. 60/162,315, filed Oct. 28, 1999; application Ser. No. 60/163,169, filed Nov. 2, 1999; application Ser. No. 60/163,170, filed Nov. 2, 1999; application Ser. No. 60/163,600 filed Nov. 4, 1999; application Ser. No. 60/164,379, filed Nov. 9, 1999; application Ser. No. 60/164,690; filed Nov. 10, 1999; application Ser. No. 60/166,289, filed Nov. 18, 1999.

This application contains subject matter that is related to co-pending patent application Ser. No. 09/639,527, filed Aug. 16, 2000; co-pending patent application Ser. No. 09/493,458, filed Jan. 28, 2000; co-pending patent application Ser. No. 09/643,920, filed Aug. 23, 2000; co-pending patent application Ser. No. 09/692,554, filed Oct. 19, 2000; co-pending patent application Ser. No. 09/644,586, filed Aug. 23, 2000; co-pending patent application Ser. No. 09/643,921, filed Aug. 23, 2000; co-pending patent application Ser. No. 09/653,261, filed Aug. 31, 2000; co-pending patent application Ser. No. 09/533,022, filed Mar. 22, 2000; co-pending patent application Ser. No. 09/697,777, filed Oct. 26, 2000; co-pending patent application Ser. No. 09/651,006, filed Aug. 29, 2000; and co-pending patent application Ser. No. 09/522,184, filed Mar. 9, 2000.

FIELD OF THE INVENTION

The present invention relates generally to telecommunications systems, and more particularly, to a system for interfacing telephony devices with packet based networks.

BACKGROUND OF THE INVENTION

Telephony devices, such as telephones, analog fax machines, and data modems, have traditionally utilized circuit switched networks to communicate. With the current state of technology, it is desirable for telephony devices to communicate over the Internet, or other packet based networks. Heretofore, an integrated system for interfacing various telephony devices over packet based networks has been difficult due to the different modulation schemes of the telephony devices. Accordingly, it would be advantageous to have an efficient and robust integrated system for the exchange of voice, fax data and modem data between telephony devices and packet based networks.

SUMMARY OF THE INVENTION

In one aspect of the present invention, a communications system includes a rate negotiator configured to negotiate a data rate with a first telephony device over a network line, and renegotiate the negotiated data rate with a remote system over a packet based network, the remote system comprising a second telephony device, and wherein the data exchange is configured to exchange data signals between the first telephony device and the remote system at the renegotiated data rate.

In another aspect of the present invention, a method of communications includes negotiating a data rate with a first telephony device over a network line, renegotiating the negotiated data rate with a remote system over a packet based network, the remote system comprising a second telephony device, and exchanging data signals between the first telephony device and the remote system at the renegotiated data rate.

In yet another aspect of the present invention, computer-readable media embodying a program of instructions executable by a computer performs a method of communications, the method including negotiating a data rate with a first telephony device over a network line, renegotiating the negotiated data rate with a remote system over a packet based network, the remote system comprising a second telephony device, and exchanging data signals between the first telephony device and the remote system at the renegotiated data rate.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Although the the rate negotiator is described in the context of a data exchange, those skilled in the art will appreciate that the rate negotiator is likewise suitable for various other telephony and telecommunications applications. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION
An Embodiment of a Signal Processing System

In a preferred embodiment of the present invention, a signal processing system is employed to interface telephony devices with packet based networks. Telephony devices include, by way of example, analog and digital phones, ethernet phones, Internet Protocol phones, fax machines, data modems, cable modems, interactive voice response systems, PBXs, key systems, and any other conventional telephony devices known in the art. The described preferred embodiment of the signal processing system can be implemented with a variety of technologies including, by way of example, embedded communications software that enables transmission of voice, fax and modem over packet based networks. The embedded communications software is preferably run on programmable digital signal processors (DSPs) and is used in gateways, cable modems, remote access servers, PBXs, and other packet based network appliances.

Figure 1:
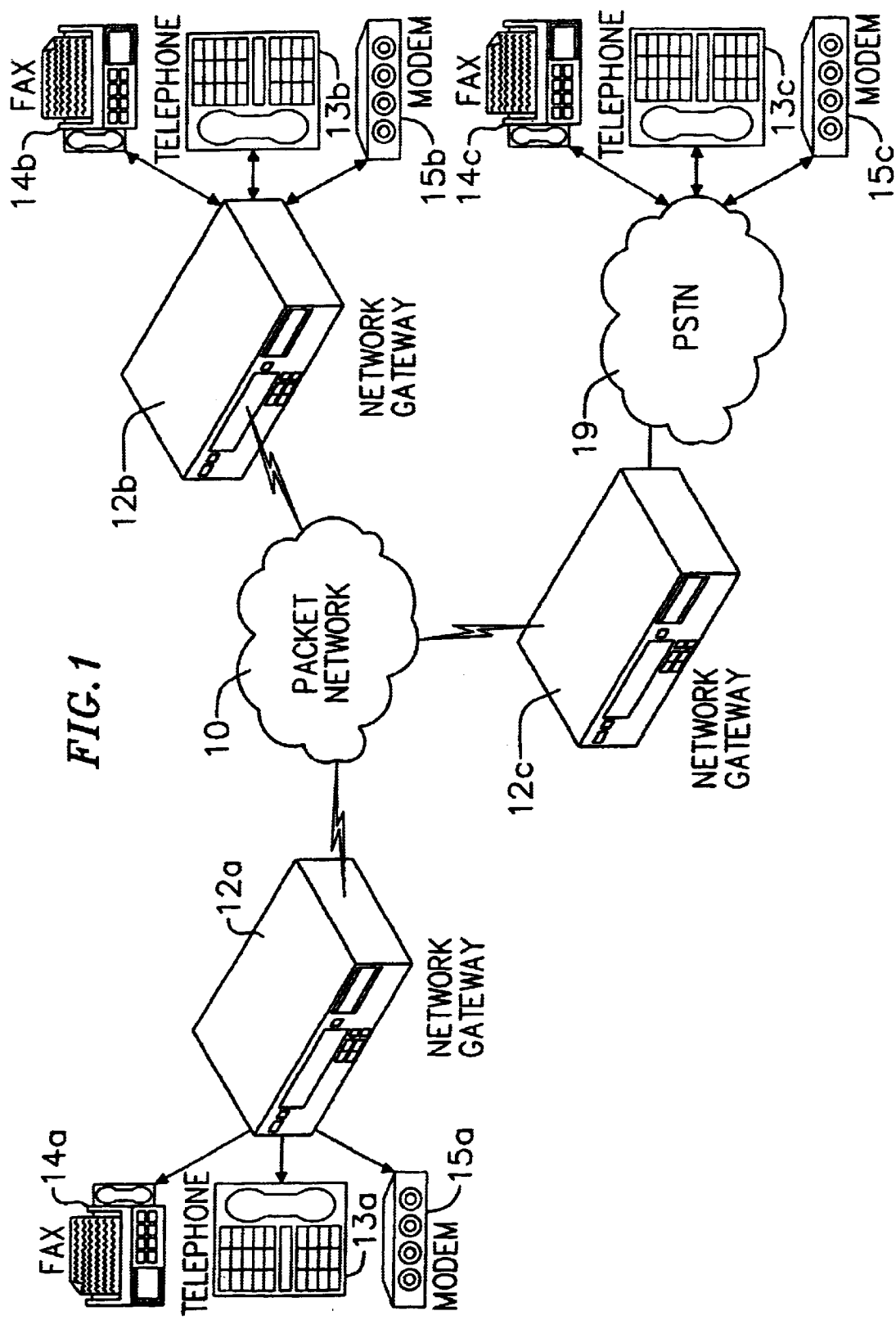
FIG. 1 is a block diagram of packet based infrastructure providing a communication medium with a number of telephony devices in accordance with a preferred embodiment of the present invention.

An exemplary topology is shown in FIG. 1 with a packet based network 10 providing a communication medium between various telephony devices. Each network gateway 12a, 12b, 12c includes a signal processing system which provides an interface between the packet based network 10 and a number of telephony devices. In the described exemplary embodiment, each network gateway 12a, 12b, 12c supports a fax machine 14a, 14b, 14c, a telephone 13a, 13b, 13c, and a modem 15a, 15b, 15c. Two of the network gateways 12a, 12b provide a direct interface between their respective telephony devices and the packet based network 10. The other network gateway 12c is connected to its respective telephony device through a public switched telephone network (PSTN) 19. The network gateways 12a, 12b, 12c permit voice, fax and modem data to be carried over packet based networks such as internet protocol (IP), frame relay (FR), asynchronous transfer mode (ATM), or any other packet based system.

Figure 2:
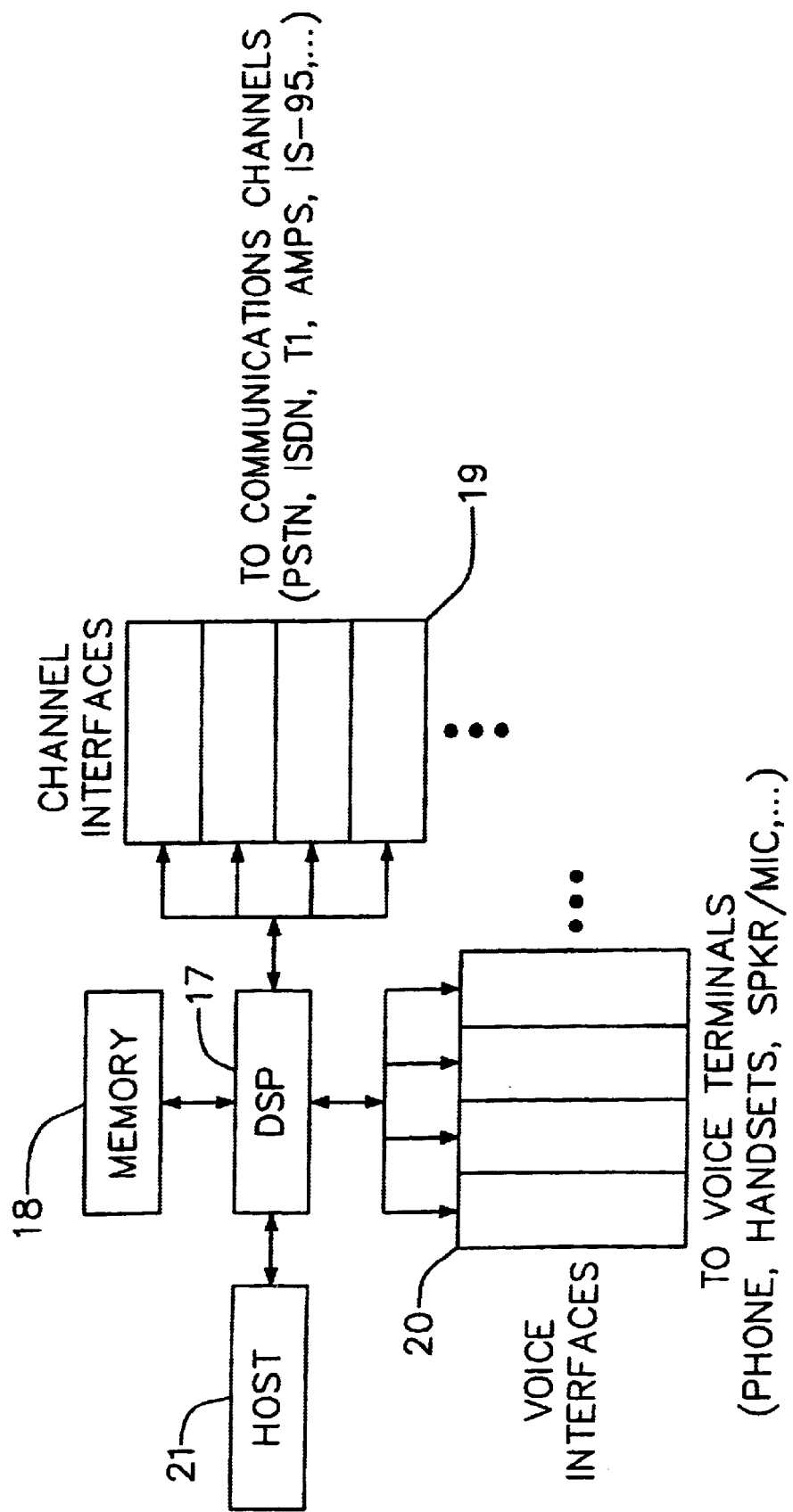
FIG. 2 is a block diagram of a signal processing system implemented with a programmable digital signal processor (DSP) software architecture in accordance with a preferred embodiment of the present invention.

The signal processing system can be implemented with a programmable DSP software architecture as shown in FIG. 2. This architecture has a DSP 17 with memory 18 at the core, a number of network channel interfaces 19 and telephony interfaces 20, and a host 21 that may reside in the DSP itself or on a separate microcontroller. The network channel interfaces 19 provide multi-channel access to the packet based network. The telephony interfaces 23 can be connected to a circuit switched network, such as a PSTN line, or directly to any telephony device.

Figure 3:
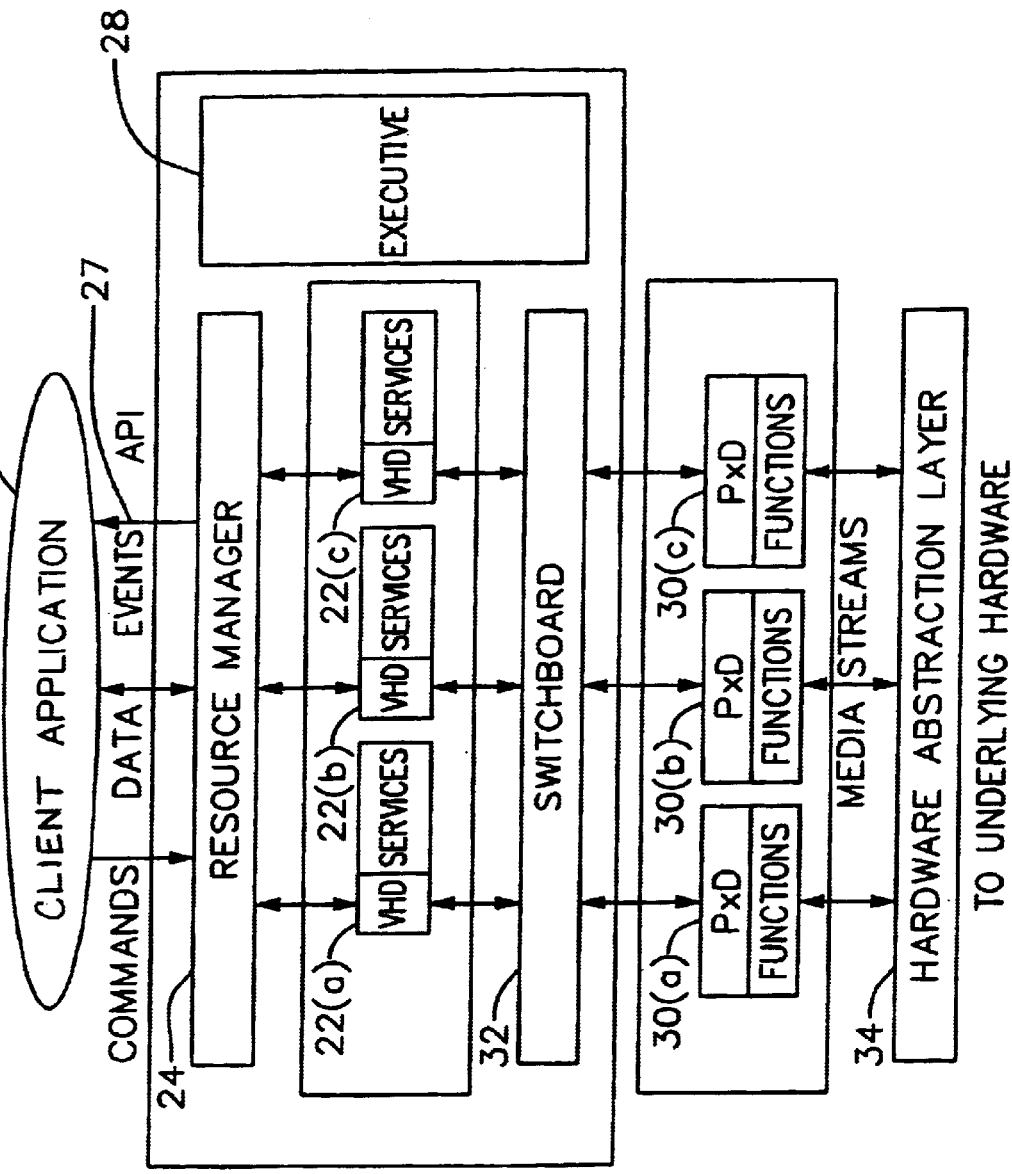
FIG. 3 is a block diagram of the software architecture operating on the DSP platform of FIG. 2 in accordance with a preferred embodiment of the present invention.

The embedded communications software binds all core DSP algorithms together, interfaces the hardware to the host 21, and provides low level services such as resource arbitration and task management. An exemplary software architecture operating on a DSP platform is shown in FIG. 3. A user application layer 26 provides overall executive control and system management, and directly interfaces a DSP server 25 to the host 21 (see to FIG. 2). The DSP server 25 provides DSP resource management and telecommunications signal processing. The DSP server 25 communicates with external telephony devices (not shown) and the underlying DSP 17 (see FIG. 2) via physical devices (PXD) 30a, 30b, 30c and a hardware abstraction layer (HAL) 34.

The DSP server 25 includes a resource manager 24 which receives commands from, forwards events to, and exchanges data with the user application layer 26. The user application layer 26 can either be resident on the DSP 17 or alternatively on the host 21 (see FIG. 2), such as a microcontroller. An application programming interface 27 (API) provides a software interface between the user application layer 26 and the resource manager 24. The resource manager 24 manages the internal/external program and data memory of the DSP 17. In addition the resource manager dynamically allocates DSP resources, performs command routing as well as other general purpose functions.

The DSP server 25 also includes virtual device drivers (VHDs) 22a, 22b, 22c. The VHDs are a collection of software algorithms that control the operation of and provide the facility for real time signal processing. Each VHD 22a, 22b, 22c includes an inbound and outbound media queue (not shown) and a library of signal processing services specific to that VHD 22a, 22b, 22c. In the described exemplary embodiment, each VHD 22a, 22b, 22c is a complete self-contained software module for processing a single channel of voice, fax and modem. Multiple channel capability can be achieved by adding VHDs to the DSP server 25. The resource manager 24 dynamically controls the creation and deletion of VHDs and services.

A switchboard 32 in the DSP server 25 dynamically inter-connects the PXDs 30a, 30b, 30c with the VHDs 22a, 22b, 22c providing multi-channel operation. Each PXD 30a, 30b, 30c is a collection of software algorithms which provide signal conditioning for one external telephony device. For example, a PXD may provide volume and gain control for telephony signals from its respective telephony device prior to communication with the switchboard 32. Voice, fax and modem functionalities can be supported on a single channel by connecting three PXDs, one for each telephony device, to a single VHD via the switchboard 32. Connections within the switchboard 32 are managed by the user application layer 26 via a set of API commands to the resource manager 24. The number of PXDs and VHDs is expandable, and limited only by the memory size and the MIPS (millions instructions per second) of the underlying hardware.

A hardware abstraction layer (HAL) 34 exchanges telephony signals with the external telephony devices, and interfaces directly with the underlying DSP 17 hardware (see FIG. 2). The HAL 34 includes basic hardware interface routines, including DSP initialization, target hardware control, codec sampling, and hardware control interface routines. The DSP initialization routine is invoked by the user application layer 26 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 34 is a physical firmware layer that isolates the communications software from the underlying hardware. This methodology allows the communications software to be ported to various hardware platforms by porting only the affected portions of the HAL 34 to the target hardware.

In operation, the user application layer 26 creates, opens, issues commands to, and processes events from the VHDs 22a, 22b, 22c via API commands to the resource manager 24. In response, each VHD 22a, 22b, 22c may invoke certain services which perform signal processing algorithms on telephony signals via the PXDs 30a, 30b, 30c. For example, when a call comes in, a VHD 22a will be automatically opened by the resource manager 24 to handle the call. The VHD 22a will then communicate to the user application layer 26 that a call is coming in. The user application layer 26 will respond to this information by opening a new VHD 22b, invoking the appropriate services, and commanding the switchboard 32 to route the incoming call between the appropriate PXD 30b and the VHD 22b. An executive 28 schedules the execution of the VHDs 22a, 22b, 22c and their associated services according to assigned priorities, and controls the multi-tasking function of the services for each VHD 22a, 22b, 22c. The executive 28 also communicates in real time the instruction cycle consumption of each VHD 22a, 22b, 22c and services to resource manager 24. The resource manager 24 may reallocate DSP resources as a result.

Figure 4:
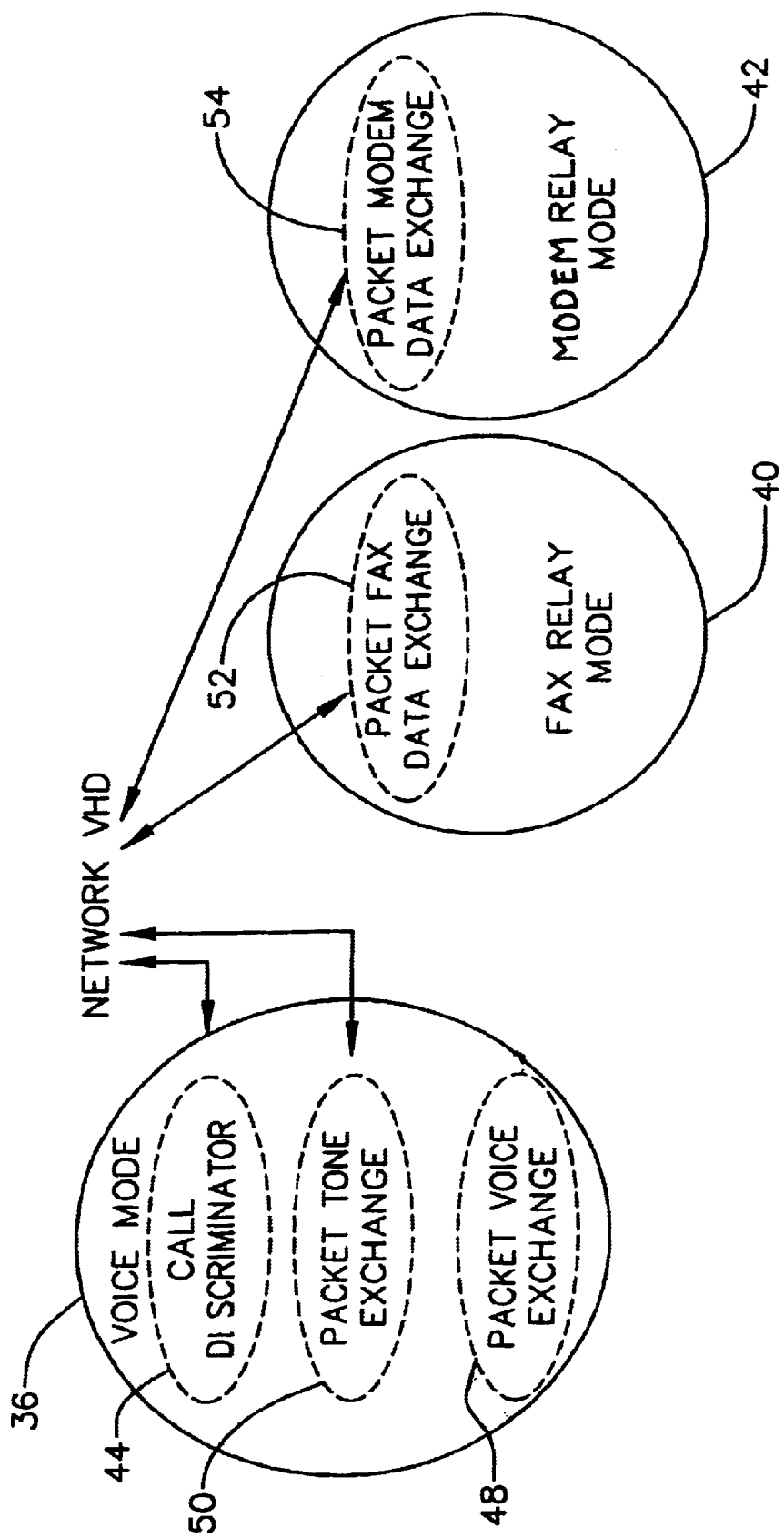
FIG. 4 is state machine diagram of the operational modes of a virtual device driver for packet based network applications in accordance with a preferred embodiment of the present invention.

The exemplary software architecture described above can be integrated into numerous telecommunications products. In a presently preferred embodiment, the software architecture is designed to support telephony signals between the traditional circuit switched network and the packet based infrastructure. A network VHD is used to support each channel of this operation. Turning to FIG. 4, an exemplary network VHD includes three operational modes, namely voice mode 36, fax relay mode 40, and modem relay mode 42. FIG. 4 shows the various services that are running in each operational mode. In the voice mode 36, call discrimination 44, packet voice exchange 48, and packet tone exchange 50 are running. In the fax relay mode 40, packet fax data exchange 52 is running. And in the modem relay mode 42, packet data modem exchange 54 is running. The network VHD controls each of the services including instantiation and removal.

In the described exemplary embodiment, the network VHD is open and initialized to the voice mode 36 of operation by the user application layer 26 (see FIG. 3) via API commands to the resource manager 24 (see FIG. 3). The call discriminator 44 is responsible for differentiating between a voice and machine call by detecting the presence of a 2100 Hz. tone (as in the case when the telephony device is a fax or a modem), a 1100 Hz. tone or V.21 channel two modulated high level data link control (HDLC) flags (as in the case when the telephony device is a fax). If a 1100 Hz. tone, or V.21 modulated HDLC flags are detected, a calling fax machine is recognized. The network VHD then terminates the voice mode 36 and invokes the packet fax data exchange service 52 to process the call. If however, 2100 Hz tone is detected, the network VHD terminates voice mode 36 and invokes the packet data modem exchange service 54.

The packet data modem exchange service 54 further differentiates between a fax and modem by analyzing the incoming signal to determine whether V.21 modulated HDLC flags are present indicating that a fax connection is in progress. If HDLC flags are detected, the network VHD terminates packet data modem exchange service 54 and initiates packet fax data exchange service 52. Otherwise, the packet data modem exchange service 54 remains operative. In the absence of an 1100 or 2100 Hz. tone, or V.21 modulated HDLC flags the voice mode 36 remains operative.

A. The Voice Mode

Figure 5:
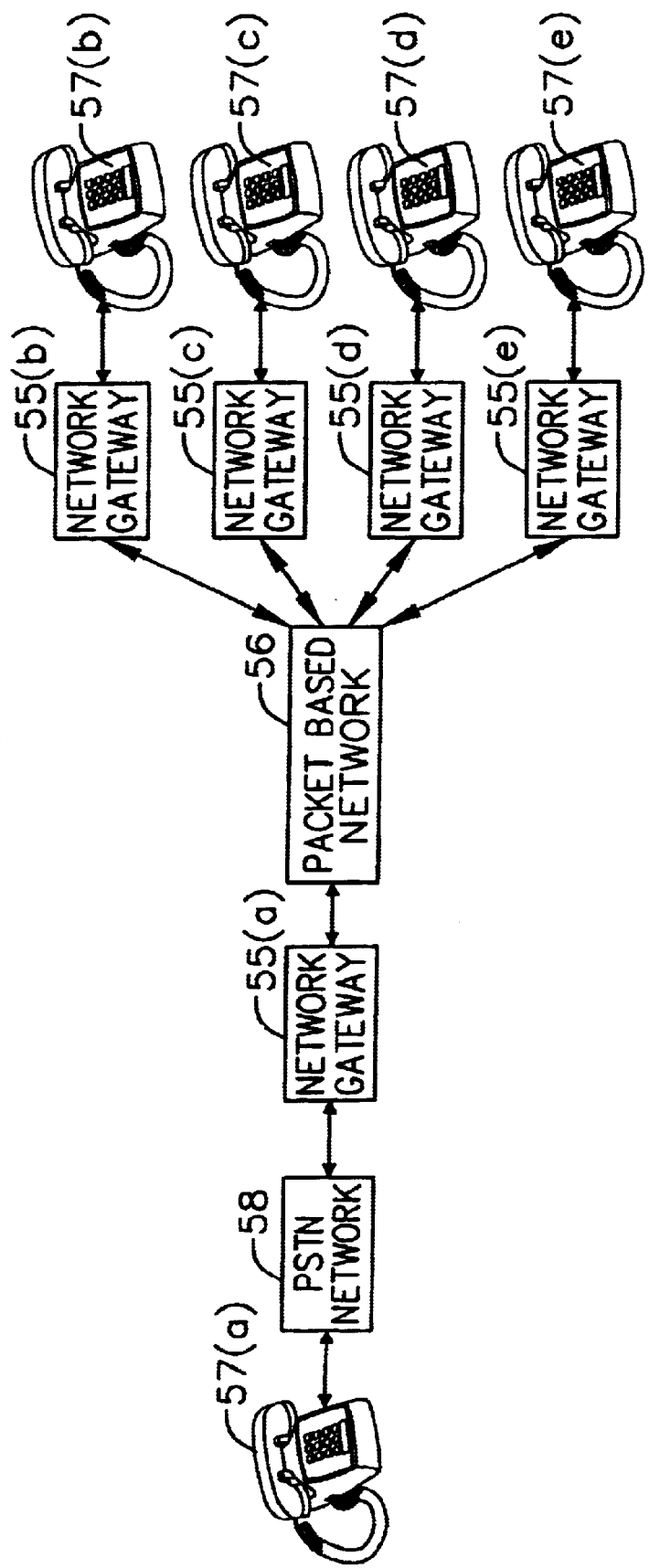
FIG. 5 is a block diagram of several signal processing systems in the voice mode for interfacing a number of telephony devices with a packet based network in accordance with a preferred embodiment of the present invention.

Voice mode provides signal processing of voice signals. As shown in the exemplary embodiment depicted in FIG. 5, voice mode enables the transmission of voice over a packet based system such as Voice over IP (VoIP, H.323), Voice over Frame Relay (VoFR, FRF-11), Voice Telephony over ATM (VTOA), or any other proprietary network. The voice mode should also permit voice to be carried over traditional media such as time division multiplex (TDM) networks and voice storage and playback systems. Network gateway 55a supports the exchange of voice between a traditional circuit switched 58 and a packet based network 56. In addition, network gateways 55b, 55c, 55d, 55e support the exchange of voice between the packet based network 56 and a number of telephones 57a, 57b, 57c, 57d, 57e. Although the described exemplary embodiment is shown for telephone communications across the packet based network, it will be appreciated by those skilled in the art that other telephony devices could be used in place of one or more of the telephones.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, voice activity detection, voice compression, and comfort noise estimation, and (2) a decoder system with delay compensation, voice decoding, DTMF generation, comfort noise generation and lost frame recovery.

Figure 6:
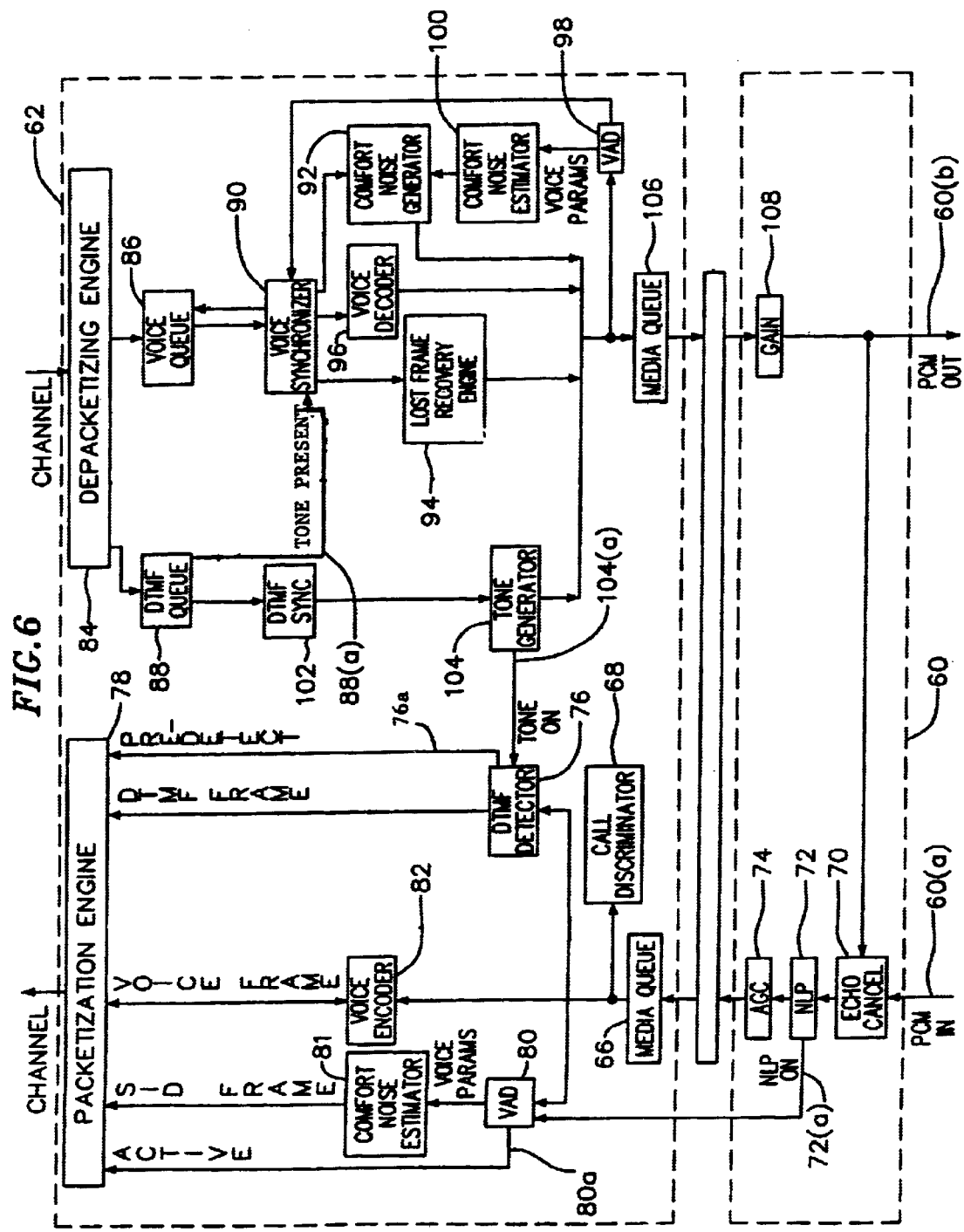
FIG. 6 is a system block diagram of a signal processing system operating in a voice mode in accordance with a preferred embodiment of the-present invention.

The services invoked by the network VHD in the voice mode and the associated PXD is shown schematically in FIG. 6. In the described exemplary embodiment, the PXD 60 provides two way communication with a telephone or a circuit switched network, such as a PSTN line carrying a 64 kb/s pulse code modulated (PCM) signal, i.e., digital voice samples.

The incoming PCM signal 60a is initially processed by the PXD 60 to remove far end echos. As the name implies, echos in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and is a major annoyance to the user.

An echo canceller 70 is used to remove echos from far end speech present on the incoming PCM signal 60a before routing the incoming PCM signal 60a back to the far end user. The echo canceller 70 samples an outgoing PCM signal 60b from the far end user, filters it, and combines it with the incoming PCM signal 60a. Preferably, the echo canceller 70 is followed by a non-linear processor (NLP) 72 which may mute the digital voice samples when far end speech is detected in the absence of near end speech. The echo canceller 70 may also inject comfort noise which may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70, however, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100, a 1100 Hz tone or V.21 modulated HDLC flags are present. As described above with reference to FIG. 4, if either tone or HDLC flags are detected, the voice mode services are terminated and the appropriate service for fax or modem operation is initiated. In the absence of a 2100, a 1100 Hz. tone, or HDLC flags, the digital voice samples are coupled to the encoder system which includes a voice encoder 82, a voice activity detector (VAD) 80, a comfort noise estimator 81, a DTMF detector 76; and a packetization engine 78.

Typical telephone conversations have as much as sixty percent silence or inactive content. Therefore, high bandwidth gains can be realized if digital voice samples are suppressed during these periods. A VAD 80, operating under the packet voice exchange service, is used to accomplish this function. The VAD 80 attempts to detect digital voice samples that do not contain active speech. If the comfort noise estimator 81 can accurately regenerate parameters for the digital voice samples without speech, silence identifier (SID) packets will be coupled to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 72 generates comfort noise, it may have a different spectral characteristic from the true background noise. The VAD 80 may detect a change in noise character when the NLP 72 is activated (or deactivated) and declare the comfort noise as active speech. For these reasons, the VAD 80 should be disabled when the NLP 72 is activated. This is accomplished by a "NLP on" message 72a passed from the NLP 72 to the VAD 80.

The voice encoder 82, operating under the packet voice exchange service, can be a straight 16 bit PCM encoder or any voice encoder which support one or more of the standards promulgated by ITU. The encoded digital voice samples are formatted into a voice packet (or packets) by the packetization engine 78. These voice packets are formatted according to an applications protocol and outputted to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 rnsec (a frame of digital voice samples is 5 ms), then a frame containing active speech will cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because. both the VAD 80 and the voice encoder 82 are integrated into some speech compression schemes such as those promulgated in ITU Recommendations G.729 with Annex B VAD (March 1996)-Coding of Speech at 8 kbits/s Using Conjugate-Structure Algebraic-Code-Exited Linear Prediction (CS-ACELP), and G.723.1 with Annex A VAD (March 1996)-Dual Rate Coder for Multimedia Communications Transmitting at 5.3 and 6.3 kbit/s, the contents of which is hereby incorporated by reference as through set forth in full herein.

Operating under the packet tone exchange service, a DTMF detector 76 determines whether or not there is a DTMF signal present at the near end. The DTMF detector 76 also provides a pre-detection flag 76a which indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

The decoding system of the network VHD 62 essentially performs the inverse operation of the encoding system. The decoding system of the network VHD 62 comprises a depacketizing engine 84, a voice queue 86, a DTMF queue 88, a voice synchronizer 90, a DTMF synchronizer 102, a voice decoder 96, a VAD 98, a comfort noise estimator 100, a comfort noise generator 92, a lost packet recovery engine 94, and a tone generator 104.

The depacketizing engine 84 identifies the type of packets received from the host (i.e., voice packet, DTMF packet, SID packet), transforms them into frames which is protocol independent, transfers the voice frames (or voice parameters in the case of SID packets) into the voice queue 86, and transfers the DTMF frames into the DTMF queue 88. In this manner, the remaining tasks are, by and large, protocol independent.

A jitter buffer 87 is utilized to compensate for network impairments such as delay jitter caused by packets not arriving at the same time or in the same order in which they were transmitted. In addition, the jitter buffer 87 compensates for lost packets that occur on occasion when the network is heavily congested. In the described exemplary embodiment, the jitter buffer 87 includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near end user during silent periods. The background noise is reconstructed by the comfort noise generator 92 from the voice parameters in the SID packets from the voice queue 86. However, the comfort noise generator 92 should not be dependent upon SID packets from the far end for proper operation. In the absence of SID packets, the voice parameters of the background noise at the far end can be determined by running the VAD 98 at the voice decoder 96 in series with a comfort noise estimator 100.

If the protocol supports SID packets, (and these are supported for VTOA, FRF-11, and VoIP), the comfort noise estimator 81 should transmit SID packets. However, for some protocols, namely, FRF-11, the SID packets are optional, and other far end users may not support SID packets at all. In these systems, the voice synchronizer 90 must continue to operate properly. The voice synchronizer 90 can invoke a number of mechanisms to compensate for delay jitter in these systems if sequence numbers are not embedded in the voice packet. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice signals can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are depacketized by the depacketizing engine 84. DTMF frames at the output of the depacketizing engine 84 are written into the DTMF queue. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant inter-digit gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

The outgoing PCM signal in the media queue 106 is coupled to the PXD 60 via the switchboard 32'. The outgoing PCM signal is coupled to an amplifier 108 before being outputted on the PCM output line 60b.

1. Echo Canceller with NLP

In an exemplary embodiment, the echo canceller can be an adaptive filter which tries to model the transfer characteristics of the hybrid and the tail circuit of the telephone circuit. The tail length supported should be at least 16 msec. The adaptive filter can be a linear transversal filter or any other suitable filter. With the linear transversal filter, the echo canceller may be unable to cancel all of the resulting echo due to the non-linearities in the hybrid and tail circuit. Thus, the NLP is used to suppress the remaining echo during periods of far end active speech with no near end speech. The NLP can be implemented with a suppressor that suppresses down to the background noise level, or suppresses completely and inserts comfort noise with the spectrum which models the true background noise. Preferably, the echo canceller is compatible with one or more of the following ITU Recommendations G.164 (1988)—Echo Suppressors, G.165 (March 1993)—Echo Cancellers, and G.168 (April 1997)—Digital Network Echo Cancellers, the contents of which are incorporated herein by reference as though set forth in full.

2. Automatic Gain Control

In an exemplary embodiment, the AGC can be either fully adaptive or have a fixed gain. Preferably, the AGC supports a filly adaptive operating mode with a range of about −30 dB to 30 dB. A default gain value can be independently established, and is typically 0 dB. If adaptive gain control is used, the initial gain value is specified by this default gain.

3. Voice Activity Detector

In an exemplary embodiment, the VAD, in either the encoder system or the decoder system, can be configured to operate in multiple modes so as to provide system tradeoffs between voice quality and bandwidth requirements. In a first mode, the VAD is always disabled and declares all digital voice samples as active speech. This mode is applicable if the signal processing system is used over a TDM network, a network which is not congested with traffic, or when used with PCM (ITU Recommendation G.711 (1988)—Pulse Code Modulation (PCM) of Voice Frequencies, the contents of which is incorporated herein by reference as if set forth in full) in a PCM bypass mode.

In a second "transparent" mode, the voice quality is indistinguishable from the first mode. In transparent mode, the VAD identifies digital voice samples with an energy below the threshold of hearing as inactive speech. The threshold may be adjustable between −90 and −40 dBm with a default value of −60 dBm default value. For loud background noise which is rich in character such as music on hold, background music, or loud background talkers (so-called cocktail noise), the threshold can be adjustable between −90 and −20 dBm with a default value of −20 dBM. The transparent mode may be used if voice quality is much more important than bandwidth. This may be the case, for example, if a G.711 voice encoder (or decoder) is used.

In a third "conservative" mode, the VAD identifies low level (but audible) digital voice samples as inactive, but will be fairly conservative about discarding the digital voice samples. A low percentage of active speech will be clipped at the expense of slightly higher transmit bandwidth. In the conservative mode, a skilled listener may be able to determine that voice activity detection and comfort noise generation is being employed.

In a fourth "aggressive" mode, bandwidth is at a premium. The VAD is aggressive about discarding digital voice samples which are declared inactive. This approach will result in speech being occasionally clipped, but system bandwidth will be vastly improved.

The transparent mode is typically the default mode when the system is operating with 16 bit PCM, companded PCM (G.711) or adaptive differential PCM (ITU Recommendations G.726 (Dec. 1990)-40, 32, 24, 16 kbit/s Using Low-Delay Code Exited Linear Prediction, and G.727 (December 1990)-5-, 4-, 3-, and 2-Sample Embedded Adaptive Differential Pulse Code Modulation). In these instances, the user is most likely concerned with high quality voice since a high bit-rate voice encoder (or decoder) has been selected. As such, a high quality VAD should be employed. The transparent mode should also be used for the VAD operating in the decoder system since bandwidth is not a concern (the VAD in the decoder system is used only to update the comfort noise parameters). The conservative mode could be used with ITU Recommendation G.728 (sept. 1992)—Coding of Speech at 16 kbit/s Using Low-Delay Code Excited Linear Prediction, G.729, and G.723.1. For systems demanding high bandwidth efficiency, the aggressive mode can be employed as the default mode.

The mechanism in which the VAD detects digital voice samples that do not contain active speech can be implemented in a variety of ways. One such mechanism entails monitoring the energy level of the digital voice samples over short periods (where a period length is typically in the range of about 10 to 30 msec). If the energy level exceeds a fixed threshold, the digital voice samples are declared active, otherwise they are declared inactive. The transparent mode can be obtained when the threshold is set to the threshold level of hearing.

Alternatively, the threshold level of the VAD can be adaptive and the background noise energy can be tracked. If the energy in the current period is sufficiently larger than the background noise estimate by the comfort noise estimator, the digital voice samples are declared active, otherwise they are declared inactive. The VAD may also freeze the comfort noise estimator or extend the range of active periods (hangover). This type of VAD is used in GSM (European Digital Cellular Telecommunications System; Half rate Speech Part 6: Voice Activity Detector (VAD) for Half Rate Speech Traffic Channels (GSM 6.42), the contents of which is incorporated herein by reference as if set forth in full) and QCELP (W. Gardner, P. Jacobs, and C. Lee, "QCELP: A Variable Rate Speech Coder for CDMA Digital Cellular," in *Speech and Audio Coding for Wireless and Network Applications*, B.S. atal, V. Cuperman, and A. Gersho (eds)., the contents of which is incorporated herein by reference as if set forth in full).

In a VAD utilizing an adaptive threshold level, speech parameters such as the zero crossing rate, spectral tilt, energy and spectral dynamics are measured and compare stored values for noise. If the parameters differ significantly from the stored values, it is an indication that active speech is present even if the energy level of the digital voice samples is low.

When the VAD operates in the conservative or transparent mode, measuring the energy of the digital voice samples can be sufficient for detecting inactive speech. However, the spectral dynamics of the digital voice samples may be useful in discriminating between long voice segments with audio spectra and long term background noise. In an exemplary embodiment of a VAD employing spectral analysis, the VAD performs auto-correlations using Itakura or Itakura-Saito distortion to compare long term estimates based on background noise to short term estimates based on a period of digital voice samples. In addition, if supported by the voice encoder, line spectrum pairs (LSPs) can be used to compare long term LSP estimates based on background noise to short terms estimates based on a period of digital voice samples. Alternatively, FFT methods can be are used when the spectrum is available from another software module.

Preferably, hangover should be applied to the end of active periods of the digital voice samples with active speech. Hangover bridges short inactive segments to ensure that quiet trailing, unvoiced sounds (such as /s/), are classified as active. The amount of hangover can be adjusted according to the mode of operation of the VAD. If a period following a long active period is clearly inactive (i.e., very low energy with a spectrum similar to the measured background noise) the length of the hangover period can be reduced. Generally, a range of about 40 to 300 msec of inactive speech following an active speech burst will be declared active speech due to hangover.

4. Comfort Noise Generator

A comfort noise generator plays noise. In an exemplary embodiment, a comfort noise generator in accordance with ITU standards G.729 Annex B or G.723.1 Annex can be used. These standards specify background noise levels and spectral content.

Alternatively, SID packets are not used or the contents of the SID packet are unspecified (see FRF-11) or the SID packets only contains an energy estimate, then estimating the parameters of the noise in the decoding system may be necessary. With this methodology, voice frames are decoded by the voice decoder and coupled to the VAD 98. The VAD 98 does not need to be invoked when comfort noise is being generated. Comfort noise parameters should not be estimated or updated by the comfort noise estimator during frame repeats or during periods in which comfort noise is being is being generated by the comfort noise generator.

The far end voice encoder should ensure that a relatively long hangover period is used in order to ensure that there are noise-only digital voice samples which the VAD decoder can identify as inactive speech. During the identified inactive periods, the digital voice samples from the voice decoder are used to update the comfort noise parameters of the comfort noise estimator. A mixed mode may also be employed whereby the energy is conveyed in a SID packet and the spectrum is estimated in the decoder system. Alternatively, if it is unknown whether or not the far end voice encoder supports (sending) SID packets, the decoder system can start with the assumption that SID packets are not being sent, and then only use the comfort noise parameters contained in the SID packets if and when a SID packet arrives.

Alternatively, the comfort noise estimate could be updated with the two or three digital voice frames which arrived immediately prior to the SID packet. The far end voice encoder should then ensure that at least two or three frames of inactive speech are transmitted before the SID packet is transmitted. This can be realized by extending the hangover period.

The comfort noise parameters at the near end are measured by the comfort noise estimator in the encoding system and transferred to the far end decoder in SID packets. The VAD determines whether the digital voice samples in the media queue 66 contain active speech. If the VAD determines that the digital voice samples do not contain active speech, then the energy and spectrum of a digital voice sample period is used to update a long running background noise energy and spectral estimate. These estimates are periodically quantized and transmitted in a SID packet by the comfort noise estimator (usually at the end of a talk spurt and periodically during the ensuing silent segment, or when the background noise parameters change appreciably). The comfort noise estimator should update the long running averages, when necessary, decide when to transmit a SID packet, and quantize and pass the quantized parameters to the packetization engine. SID packets should not be sent while on-hook, unless they are required to keep the permanent virtual connection between the telephony devices alive. There may be multiple quantization methods depending on the protocol chosen.

5. Voice Encoder/Voice Decoder

In an exemplary embodiment, the voice encoder and the voice decoder support one or more voice compression algorithms, including but not limited to, 16 bit PCM (non-standard, and only used for diagnostic purposes); ITU-T standard G.711 at 64 kb/s; G.723.1 at 5.3 kb/s (ACELP) and 6.3 kb/s (MP-MLQ); ITU-T standard G.726 (ADPCM) at 16, 24, 32, and 40 kb/s; ITU-T standard G.727 (Embedded ADPCM) at 16, 24, 32, and 40 kb/s; ITU-T standard G.728 (LD-CELP) at 16 kb/s; and ITU-T standard G.729 Annex A (CS-ACELP) at 8 kb/s.

The packetization interval for 16 bit PCM, G.711, G.726, G.727 and G.728 should be a multiple of 5 msec. The packetization interval is the time duration of the digital voice samples that are encapsulated into a single voice packet. The voice encoder (decoder) interval is the time duration in which the voice encoder (decoder) is enabled. The packetization interval should be an integer multiple of the voice encoder (decoder) interval. By way of example; G.729 encodes frames containing 80 digital voice samples at 8 kHz which is equivalent to a voice encoder (decoder) interval of 10 msec. If two subsequent encoded frames of digital voice sample are collected and transmitted in a single packet, the packetization interval in this case would be 20 msec.

G.711, G.726, and G.727 encodes digital voice samples on a sample by sample basis. Hence, the minimum voice encoder (decoder) interval is 0.125 msec. This is somewhat of a short voice encoder (decoder) interval, especially if the packetization interval is a multiple of 5 msec. Therefore, a single voice packet will contain 40 frames of digital voice samples.

G.728 encodes frames containing 5 digital voice samples (or 0.625 msec). A packetization interval of 5 msec (40 samples) can be supported by 8 frames of digital voice samples.

G.723.1 compresses frames containing 240 digital voice samples. The voice encoder (decoder) interval is 30 msec, and the packetization interval should be a multiple of 30 msec.

Packetization intervals which are not multiples of the voice encoder (or decoder) interval can be supported by a change to the packetization engine or the depacketization engine. This may be acceptable for a voice encoder (or decoder) such as G.711 or 16 bit PCM, but the packetization interval should be a multiple of the voice encoder or decoder frame size.

The G.728 standard may be desirable for some applications. G.728 is used fairly extensively in proprietary voice conferencing situations and it is a good trade-off between bandwidth and quality at a rate of 16 kb/s. Its quality is superior to that of G.729 under many conditions, and it has a much lower rate than G.726, or G.727. However, G.728 is MIPS intensive.

Differentiation of various voice encoders (or decoders) may come at a reduced complexity. By way of example, both G.723.1 and G.729 could be modified to reduce complexity, enhance performance, or reduce possible IPR conflicts. Performance may be enhanced by using the voice encoder (or decoder) as an embedded coder. For example, the "core" voice encoder (or decoder) could be G.723.1 operating at 5.3 kb/s with "enhancement" information added to improve the voice quality. The enhancement information may be discarded at the source or at any point in the network, with the quality reverting to that of the "core" voice encoder (or decoder). Embedded coders can be implemented since they are based on a given core. Embedded coders are rate scalable, and are well suited for packet based networks. If a higher quality 16 kb/s voice encoder (or decoder) is required, one could use G.723.1 or G.729 Annex A at the core, with an-extension to scale the rate up to 16 kb/s (or whatever rate was desired).

The configurable parameters for each voice encoder or decoder include the rate at which it operates (if applicable), which companding scheme to use, the packetization interval, and the core rate if the voice encoder (or decoder) is an embedded coder. For G.727, the configuration is in terms of bits/sample. For example EADPCM(5,2) (Embedded ADPCM, G.727) has a bit rate of 40 kb/s (5 bits/sample) with the core information having a rate of 16 kb/s (2 bits/sample).

6. Packetization Engine

In an exemplary embodiment, the packetization engine groups voice frames from the voice encoder, and with information from the VAD , creates voice packets in a format appropriate for the packet based network. The two primary voice packet formats are generic voice packets and SID packets. The format of each voice packet is a function of the voice encoder used, the selected packetization interval, and the protocol.

Those skilled in the art will readily recognize that the packetization engine could be implemented in the host. However, this may unnecessarily burden the host with configuration and protocol details, and therefore, if a complete self contained signal processing system is desired, then the packetization engine should be operated in the network VHD. Furthermore, there is significant interaction between the voice encoder, the VAD, and the packetization engine, which further promotes the desirability of operating the packetization engine in the network VHD.

The packetization engine may generate the entire voice packet or just the voice portion of the voice packet. In particular, a fully packetized system with all the protocol headers may be implemented, or alternatively, only the voice portion of the packet will be delivered to the host. By way of example, for VoIP, it is reasonable to create the RTP encapsulated packet with the packetization engine, but have the remaining TCP/IP stack residing in the host. In the described exemplary embodiment, the voice packetization functions reside in the packetization engine. The voice packet should be formatted according to the particular standard, although not all headers or all components of the header need to be constructed.

7. Voice Depacketizing Engine/Voice Queue

In an exemplary embodiment, voice de-packetization and queuing is a real time task which queues the voice packets with a time stamp indicating the arrival time. The voice queue should accurately identify packet arrival time within one msec resolution. Resolution should preferably not be less than the encoding interval of the far end voice encoder. The depacketizing engine should have the capability to process voice packets that arrive out of order, and to dynamically switch between voice encoding methods (i.e. between, for example, G.723.1 and G.711). Voice packets should be queued such that it is easy to identify the voice frame to be released, and easy to determine when voice packets have been lost or discarded en route.

The voice queue may require significant memory to queue the voice packets. By way of example, if G.711 is used, and the worst case delay variation is 250 msec, the voice queue should be capable of storing up to 500 msec of voice frames. At a data rate of 64 kb/s this translates into 4000 bytes or, or 2K (16 bit) words of storage. Similarly, for 16 bit PCM, 500 msec of voice frames require 4K words. Limiting the amount of memory required may limit the worst case delay variation of 16 bit PCM and possibly G.711 This, however, depends on how the voice frames are queued, and whether dynamic memory allocation is used to allocate the memory for the voice frames. Thus, it is preferable to optimize the memory allocation of the voice queue.

The voice queue transforms the voice packets into frames of digital voice samples. If the voice packets are at the fundamental encoding interval of the voice frames, then the delay jitter problem is simplified. In an exemplary embodiment, a double voice queue is used. The double voice queue includes a secondary queue which time stamps and temporarily holds the voice packets, and a primary queue which holds the voice packets, time stamps, and sequence numbers. The voice packets in the secondary queue are disassembled before transmission to the primary queue. The secondary queue stores packets in a format specific to the particular protocol, whereas the primary queue stores the packets in a format which is largely independent of the particular protocol.

In practice, it is often the case that sequence numbers are included with the voice packets, but not the SID packets, or a sequence number on a SID packet is identical to the sequence number of a previously received voice packet. Similarly, SID packets may or may not contain useful information. For these reasons, it may be useful to have a separate queue may be provided for received SID packets.

The depacketizing engine is preferably configured to support VoIP, VTOA, VoFR and other proprietary protocols. The voice queue should be memory efficient, while providing the ability to dynamically switch between voice encoders (at the far end), allow efficient reordering of voice packets (used for VoIP) and properly identify lost packets.

8. Voice Synchronization

In an exemplary embodiment, the voice synchronizer analyzes the contents of the voice queue and determines when to release voice frames to the voice decoder, when to play comfort noise, when to perform frame repeats (to cope with lost voice packets or to extend the depth of the voice queue), and when to perform frame deletes (in order to decrease the size of the voice queue). The voice synchronizer manages the asynchronous arrival of voice packets. For those embodiments which are not memory limited, a voice queue with sufficient fixed memory to store the largest possible delay variation is used to process voice packets which arrive asynchronously. Such an embodiment includes sequence numbers to identify the relative timings of the voice packets. The voice synchronizer should ensure that the voice frames from the voice queue can be reconstructed into high quality voice, while minimizing the end-to-end delay. These are competing objectives so the voice synchronizer should be configured to provide system trade-off between voice quality and delay.

Preferably, the voice synchronizer is adaptive rather than fixed based upon the worst case delay variation. This is especially true in cases such as VoIP where the worst case delay variation can be on the order of a few seconds. By way of example, consider a VoIP system with a fixed voice synchronizer based on a worst case delay variation of 300 msec. If the actual delay variation is 280 msec, the signal processing system operates as expected. However, if the actual delay variation is 20 msec, then the end-to-end delay is at least 280 msec greater than required. In this case the voice quality should be acceptable, but the delay would be undesirable. On the other hand, if the delay variation is 330 msec then an underflow condition could exist degrading the voice quality of the signal processing system.

The voice synchronizer performs four primary tasks. First, the voice synchronizer determines when to release the first voice frame of a talk spurt from the far end. Subsequent to the release of the first voice frame, the remaining voice frames are released in an isochronous manner. In an exemplary embodiment, the first voice frame is held for a period of time that is equal or less than the estimated worst case jitter.

Second, the voice synchronizer estimates how long the first voice frame of the talk spurt should be held. If the voice synchronizer underestimates the required "target holding time," jitter buffer underflow will likely result. However, jitter buffer underflow could also occur at the end of a talk spurt, or during a short silence interval. Therefore, SID packets and sequence numbers could be used to identify what caused the jitter buffer underflow, and whether the target holding time should be increased. If the voice synchronizer overestimates the required "target holding time," all voice frames will be held too long causing jitter buffer overflow. In response to jitter buffer overflow, the target holding time should be decreased. In the described exemplary embodiment, the voice synchronizer increases the target holding time rapidly for jitter buffer underflow due to excessive jitter, but decreases the target holding time slowly when holding times are excessive. This approach allows rapid adjustments for voice quality problems while being more forgiving for excess delays of voice packets.

Thirdly, the voice synchronizer provides a methodology by which frame repeats and frame deletes are performed within the voice decoder. Estimated jitter is only utilized to determine when to release the first frame of a talk spurt. Therefore, changes in the delay variation during the transmission of a long talk spurt must be independently monitored. On buffer underflow (an indication that delay variation is increasing), the voice synchronizer instructs the lost frame recovery engine to issue voice frames repeats. In particular, the frame repeat command instructs the lost frame recover engine to utilize the parameters from the previous voice frame to estimate the parameters of the current voice frame. Thus, if frames 1, 2 and 3 are normally transmitted and frame 3 arrives late, frame repeat is issued after frame number 2, and if frame number 3 arrives during this period, it is then transmitted. The sequence would be frames 1,2, a frame repeat and then frame 3. Performing frame repeats causes the delay to increase, which increasing the size of the jitter buffer so as to cope with increasing delay characteristics during long talk spurts. Frame repeats are also issued to replace voice frames that are lost en route.

Conversely, if the holding time is too large due to decreasing delay variation, the speed at which voice frames are released should be increased. Typically, the target holding time can be adjusted, which automatically compresses the following silent interval. However, during a long talk spurt, it may be necessary to decrease the holding time more rapidly to minimize the excessive end to end delay. This can be accomplished by passing two voice-frames to the voice decoder in one decoding interval but only one of the voice frames is transferred to the media queue.

The voice synchronizer must also function under conditions of severe buffer overflow, where the physical memory of the signal processing system is insufficient due to excessive delay variation. When subjected to severe buffer overflow, the voice synchronizer could simply discard voice frames.

The voice synchronizer should operate with or without sequence numbers, time stamps, SID packets, voice packets arriving out of order and lost voice packets. In addition, the voice synchronizer preferably provides a variety of configuration parameters which can be specified by the host for optimum performance, including minimum and maximum target holding time. With these two parameters, it is possible to use a fully adaptive jitter buffer by setting the minimum target holding time to zero msec and the maximum target holding time to 500 msec (or the limit imposed due to memory constraints). Although the preferred voice synchronizer is fully adaptive and able to adapt to varying network conditions, those skilled in the art will appreciate that the voice synchronizer can also be maintained at a fixed holding time by setting the minimum and maximum holding times to be equal.

9. Lost Packet Recovery/Frame Deletion

The lost packet recovery engine can be configured to provide frame insertion, and frame deletion capability for all voice decoders under consideration. For G.729 Annex A and G.723.1, the lost frame recovery mechanism can be part of the voice decoder. The same mechanism may be used for frame insertion. Frame deletion can be realized by simply passing two consecutive voice frames to the voice decoder in the same decoding interval, and discarding one of the voice frames. In this manner, the end to end delay will be decreased in time by one decoding interval.

The frame deletion mechanism can likewise be fully integrated into both G.723.1 and G.729 Annex A. This reduces the complexity of the frame deletion mechanism and allows voice frames to be discarded over a longer interval to improve the overall quality. However, since the frame deletion is a low probability event, the short term impact on voice quality should be minor. Alternatively, a non-integrated frame deletion mechanism can also be used.

For voice decoders other than G.723.1 and G729 Annex A, it is desirable to have a method to handle lost voice packets and to implement a frame insertion scheme. However, the likelihood of requiring a frame insertion is typically low and the position of the frame insertion can be selected based on decoded voice energy. This allows the frame insertion mechanism to be realized through the use of the lost frame recovery mechanism, whereby the frames from a lost voice packet are simply inserted between consecutive voice frames. In other words, between frame n and n+1, a frame loss is inserted. This effectively increases the end to end delay by one decoding interval.

Similarly, voice packet loss for voice telephony over ATM and voice over FR should also be a low probability event. However, for voice over IP frame losses can be excessive. In fact, in TCP/IP congestion can be mitigated by having routers discard voice packets. When end points detect the voice discarded packets, they typically will reduce their transmission rate. If the network begins to get congested, voice packet losses (which can get quite high) will occur. Thus, an efficient frame loss recovery mechanism is desired to maintain reasonably high quality during voice packet losses.

Figure 7:
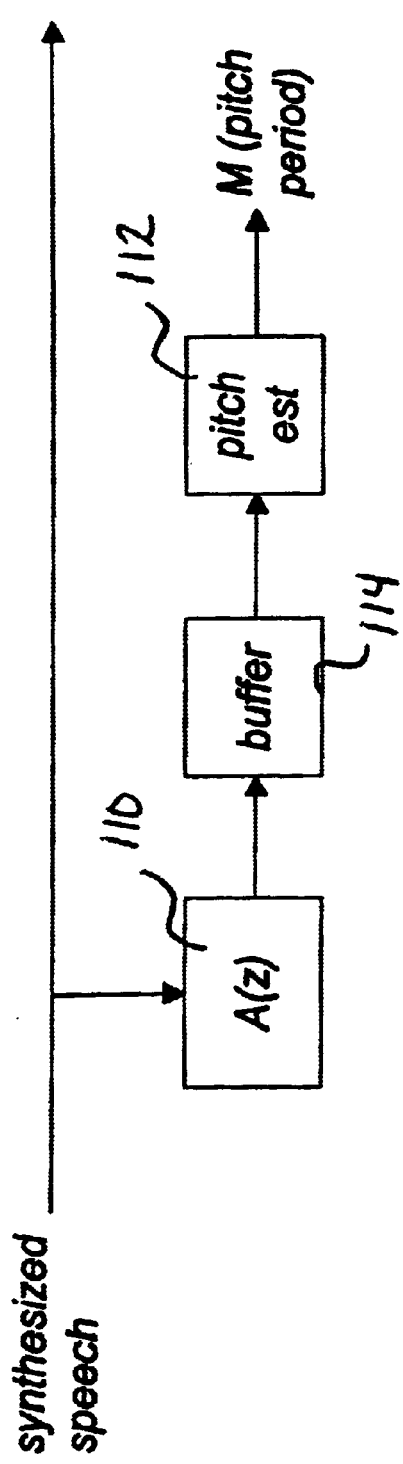
FIG. 7 is a block diagram of a method for obtaining voice parameters for future frame loss conditions in accordance with a preferred embodiment of the present invention.

Lost voice frames can be estimated by first estimating the pitch period based on digital voice samples contained in the previous frames, and then repeating the previous excitation to an LPC filter delayed by one (or possible more) pitch periods. An exemplary embodiment for estimating the pitch period and excitation during previous good voice frames is shown in FIG. 7. Normally, when a voice frame is available from the voice decoder (or comfort noise generator 92), the LPC is estimated based on a frame of current plus past digital voice samples (over a window length in the range of about 20 to 30 msec). The digital voice samples over the decoding interval is then passed through a LPC inverse filter 10 to obtain the LPC residual. The residual (both current and past) or perhaps a combination of the residual and past digital voice samples is used to obtain a pitch estimate using, for example, a pitch estimator 112 or correlation measurement. In fact, a pitch estimator similar to that used in G.729 Annex A may be used. In this instance, pitch doubling is not a serious problem since this lost frame recovery system is only used in an attempt to recover a lost voice packet. Typically, past residuals should be stored in a buffer 114 of about at least 120 to 160 digital voice samples, and a pitch period range of between (about) 20 and 140 digital voice samples should be analyzed.

Figure 8:
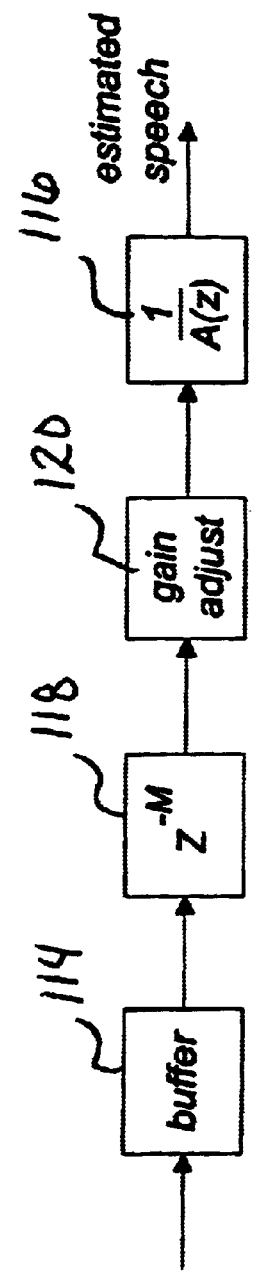
FIG. 8 is a block diagram of a method for generating estimates of lost speech frames in accordance with a preferred embodiment of the present invention.

During a voice packet loss condition, the residual used to excite the LPC synthesis filter 116 is estimated by selecting a scaled residual from one (or more) pitch periods in the past $(Z^{-M})$ 118. The pitch period is that which was estimated in the previous good voice frame. Referring to FIG. 8, a gain adjuster 120 slowly increases the gain to reduce the output energy during multiple frame loss conditions. If the voice packet loss condition extends for more than 40 or 50 msec, the resulting digital voice samples should be significantly muted, and the signal processing system should switch from issuing frame losses to generating comfort noise. (This control should be placed in the voice synchronizer which controls when the voice decoder, comfort noise generator, and lost packet recovery engine are invoked). During a voice packet loss condition the estimated residual is saved in the past residual buffer 114 to ensure that for multiple frame losses from one or more voice packets a past residual is still available. If a strong pitch component is not identified, rather than repeating past excitation delayed by the estimated (best) pitch period a random (gaussian, for example) excitation can be used to excite the LPC synthesis filter 116. The random excitation should be scaled such that the power is slightly less than that in the last good voice frame.

The capability of the voice decoder should be considered when selecting the lost packet recovery engine 94. For voice decoder's which are less MIPS intensive, such as G.726, G.727 and G.711, the added complexity of the lost packet recovery engine would not increase the complexity to that of say G.729 Annex A or G.723.1. The lost frame recovery engine should preferably be on the order of 1 MIP, or less. For more complex voice decoders such as G.728, the parameters used for lost voice packet recovery (LPC filter and pitch period) are known at the voice decoder. The lost frame recovery mechanism could be integrated directly into G.728. This is a lower complexity solution, and is preferred for G.728.

10. DTMF

There are two functions performed by DTMF. The first function performs call routing and the second function performs DTMF relay.

DTMF (dual-tone, multi-frequency) tones are signaling tones carried within the audio band. DTMF is used for dialing, interactive voice response systems (IVR), and for PBX to PBX or PBX to central office signaling.

There are numerous problems involved with the transmission of DTMF in band over a packet based network. For example, lossy voice decoding may distort a valid DTMF tone or sequence into an invalid sequence. Also voice packet losses of digital voice samples may corrupt DTMF sequences and delay variation (jitter) may corrupt the DTMF timing information and lead to lost digits. The severity of the various problems depends on the particular voice decoder, the voice decoder rate, the voice packet loss rate, the delay variation, and the particular implementation of the signal processing system. For applications such as VoIP with potentially significant delay variation, high voice packet loss rates, and low digital voice sample rate (if G.723.1 is used), packet tone exchange is desirable. Packet tone exchange is also desirable for VoFR (FRF-11, class 2).

DTMF events are preferably reported to the host. This allows the host, for example, to convert the DTMF sequence of keys to a destination address. It will, therefore, allow the host to support call routing via DTMF.

Depending on the protocol, the packet tone exchange service might support muting of the received digital voice samples, or discarding voice frames when DTMF is detected. Note that the voice packets may be queued (but not released) in the encoder system when DTMF is pre-detected. If the detection was false (invalid), the voice packets are ultimately released, otherwise they are discarded. This will manifest itself as occasional jitter when DTMF is falsely detected.

Software to route calls via DTMF can be resident on the host or within the signal processing system. Essentially, the packet tone exchange traps DTMF tones and reports them to the host or a higher layer. In an exemplary embodiment, the packet tone exchange will generate dial tone when an off-hook condition is detected. Once a DTMF digit is detected, the dial tone is terminated. The packet tone exchange may also have to play ringing tone back to the near end user (when the far end phone is being rung), and a busy tone if the far end phone is unavailable. Other tones may also need to be supported to indicate all circuits are busy, or an invalid sequence of DTMF digits were entered.

B. The Fax Relay Mode

Figure 9:
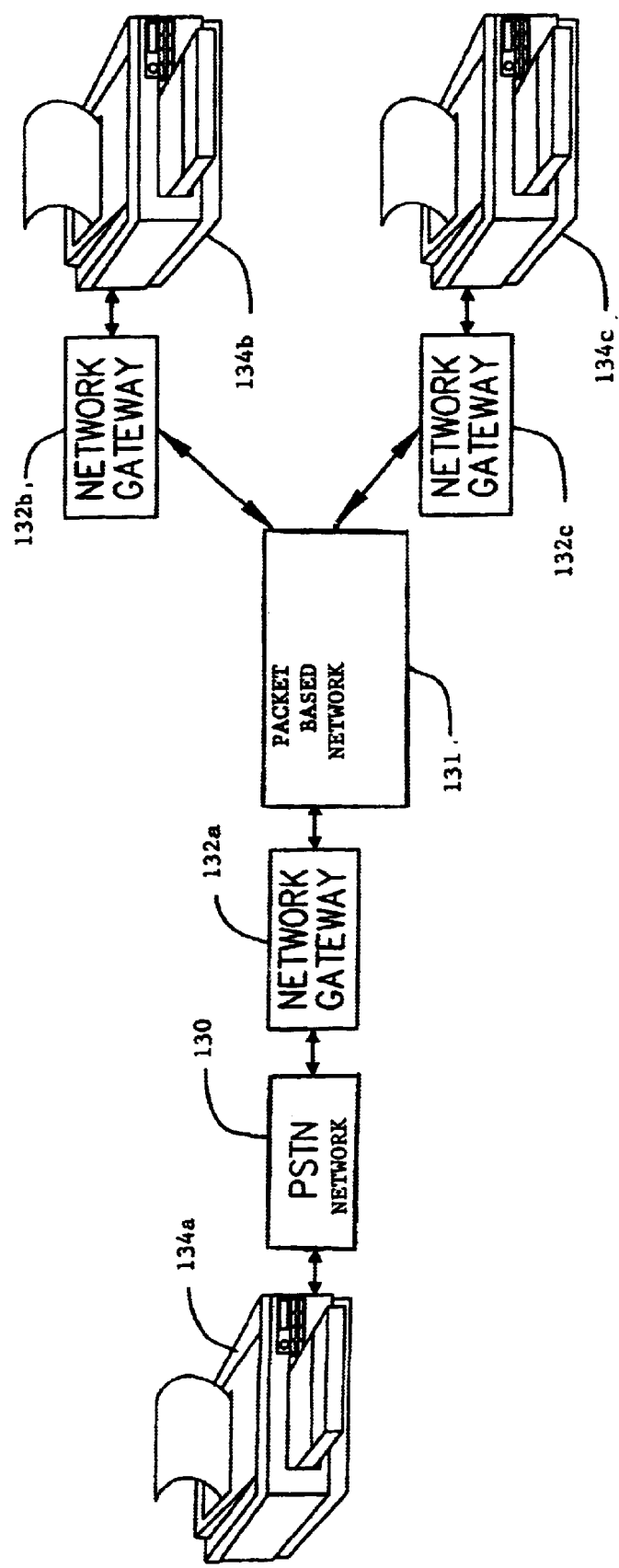
FIG. 9 is a block diagram of several signal processing systems in the fax relay mode for interfacing a number of telephony devices with a packet based network in accordance with a preferred embodiment of the present invention.

Fax relay mode provides signal processing of fax signals. As shown in FIG. 9, fax relay mode enables the transmission of fax signals over a packet based system such as VoIP, VoFR, FRF-11, VTOA, or any other proprietary network. The fax relay mode should also permit data signals to be carried over traditional media such as TDM. Network gateways 132a, 132b, 132c, the operating platform for the signal processing system in the described exemplary embodiment, support the exchange of fax signals between a packet based network 56 and various fax machines 134a, 134b, 134c. For the purposes of explanation, the first fax machine is a sending fax 134a. The sending fax 134a is connected to the sending network gateway 132a through a PSTN line 130. The sending network gateway 132a is connected to a packet based network 131. Additional fax machines 134b, 134c are at the other end of the packet based network 131 and include receiving fax machines 134b, 134c and receiving network gateways 132b, 132c. The receiving network gateways 132b, 132b provide a direct interface between their respective fax machines 134b, 134c and the packet based network 131.

The transfer of fax data signals over packet based networks can be accomplished by three alternative methods. In the first method, fax data signals are exchanged in real time. Typically, the sending and receiving fax machines are spoofed to allow transmission delays plus jitter of up to about 1.2 seconds. The second, store and forward mode, is a non real time method of transferring fax data signals. Typically, the fax communication is transacted locally, stored into memory and transmitted to the destination fax machine at a subsequent time. The third mode is a combination of store and forward mode with minimal spoofing to provide an approximate emulation of a typical fax connection.

In the fax relay mode, the network VHD invokes the packet fax data exchange service in the fax relay mode. The packet fax data exchange service provides demodulation and re-modulation of fax data signals. This approach results in considerable bandwidth savings since only the underlying unmodulated data signals are transmitted across the packet based network. The packet fax data exchange service also provides compensation for network jitter with a jitter buffer similar to that invoked in the packet voice exchange service. Additionally, the packet fax data exchange service compensates for lost data packets with error correction processing. Spoofing may also be provided during various stages of the procedure between the fax machines to keep the connection alive.

The packet fax data exchange service is divided into two basic functional units, a demodulation system and a re-modulation system. In the demodulation system, the network VHD exchanges fax data signals from a circuit switched network, or a fax machine, to the packet based network. In the re-modulation system, the network VHD exchanges fax data signals from the packet network to the switched circuit network to a circuit switched network, or a fax machine directly.

Figure 10:
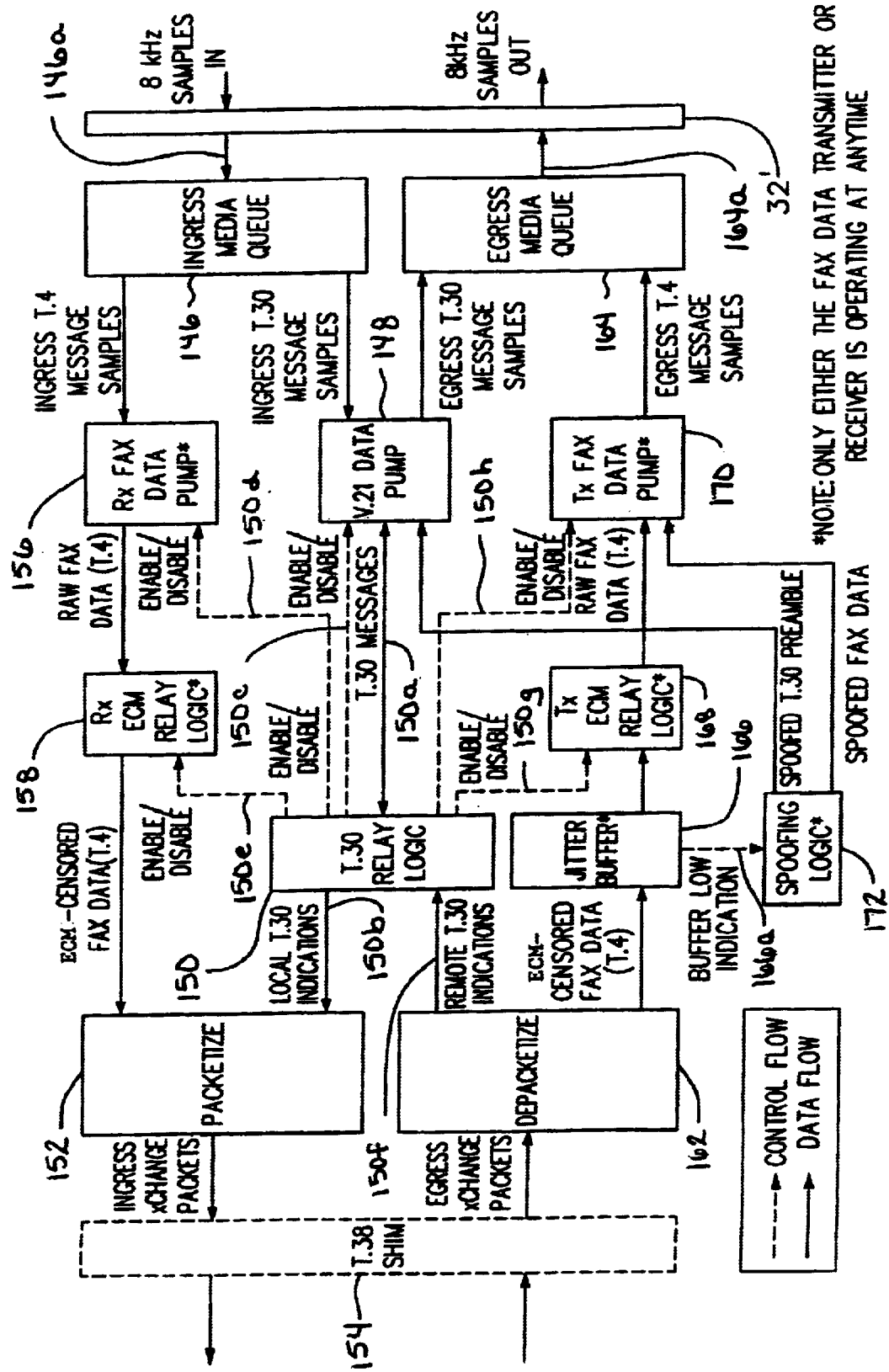
FIG. 10 is a system block diagram of a signal processing system operating in a real time fax relay mode in accordance with a preferred embodiment of the present invention.

During real time relay of fax data signals over a packet based network, the sending and receiving fax machines are spoofed to accommodate network delays plus jitter. Typically, the packet fax data exchange service can accommodate a total delay of up to about 1.2 seconds. Preferably, the packet fax data exchange service supports error correction mode (ECM) relay functionality, although a full ECM implementation is typically not required. In addition, the packet fax data exchange service should preferably preserve the typical call duration required for a fax session over a GSTN/ISDN when exchanging fax data signals over a network The packet fax data exchange service for the real time exchange of fax data signals between a circuit switched network and a packet based network is shown schematically in FIG. 10. In this exemplary embodiment, a connecting PXD (not shown) connecting the fax machine to the switch board 32' is transparent, although those skilled in the art will appreciate that various signal conditioning algorithms could be programmed into PXD such as echo cancellation and gain.

After the PXD (not shown), the incoming fax data signal 146*a* is coupled to the demodulation system of the packet fax data exchange service operating in the network VHD via the switchboard 32'. The incoming fax data signal 146*a* is received and buffered in an ingress media queue 146. A V.21 data pump 148 demodulates incoming T.30 message so that T.30 relay logic 150 can decode the received T.30 messages 150*a*. Local T.30 indications 150*b* are packetized by a packetization engine 152 and if required, translated into T.38 packets via a T.38 shim 154 for transmission to a remote fax device (not shown) across the packet based network. The V.21 data pump 148 is selectively enabled/disabled 150*c* by the T.30 relay logic 150 in accordance with the reception/transmission of the T.30 messages or fax data signals. The V.21 data pump 148 is common to the demodulation and re-modulation system, and the packet fax data exchange service includes the ability to transmit called station tone (CED) and calling station tone (CNG) to support fax setup.

The demodulation system further includes a receive fax data pump 156 which demodulates the fax data signals during the data transfer phase. The receive fax data pump 156 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The V.34 fax standard, once approved, may also be supported. The T.30 relay logic 150 enables/disables 150*d* the receive fax data pump 156 in accordance with the reception of the fax data signals or the T.30 messages.

If error correction mode (ECM) is required, receive ECM relay logic 158 performs high level data link control(HDLC )de-framing, including bit de-stuffing and preamble removal on ECM frames contained in the data packets. The resulting fax data signals are then packetized by the packetization engine 152 and communicated across the packet based network. The T.30 relay logic 150 selectively enable/disables 150*e* the receive ECM relay logic 158 in accordance with the error correction mode of operation.

In the re-modulation system, if required, incoming data packets are first translated from a T.38 packet format to a protocol independent format by the T.38 packet shim 154. The data packets are then de-packetized by a depacketizing engine 162. The data packets may contain T.30 messages or fax data signals. The T.30 relay logic 150 reformats the remote T.30 indications 150*f* and forwards the resulting T.30 indications to the local fax machine (not shown) via the V.21 data pump 148. The modulated output of the V.21 data pump 148 is forwarded to an egress media queue 164 for transmission in either analog format or after suitable conversion, as 64 kbps PCM samples to the local fax device over a circuit switched network, such as for example a PSTN line.

De-packetized fax data signals are transferred from the depacketizing engine 162 to a jitter buffer 166. If error correction mode (ECM) is required, transmitting ECM relay logic 168 performs HDLC de-framing, including bit stuffing and preamble addition on ECM frames. The transmitting ECM relay logic 168 forwards the fax data signals, (in the appropriate format) to a transmit fax data pump 170 which modulates the fax data signals and outputs 8 KHz digital samples to the egress media queue 164. The T.30 relay logic selectively enables/disables (150*g*) the transmit ECM relay logic 168 in accordance with the error correction mode of operation.

The transmit fax data pump 170 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The T.30 relay logic selectively enables/disables (150*h*) the transmit fax data pump 170 in accordance with the transmission of the fax data signals or the T.30 message samples.

If the jitter buffer 166 underflows, a buffer low indication 166*a* is coupled to spoofing logic 172. Upon receipt of a buffer low indication during the fax data signal transmission, the spoofing logic 172 inserts "spoofed data" at the appropriate place in the fax data signals via the transmit fax data pump 170 until the jitter buffer 166 is filled to a predetermined level, at which time the fax data signals are transferred out of the jitter buffer 166. Similarly, during the transmission of the T.30 message indications, the spoofing logic 172 can insert "spoofed data" at the appropriate place in the T.30 message samples via the V.21 data pump 148.

1. Data Rate Management

An exemplary embodiment of the packet fax data exchange service complies with the T.38 recommendations for real-time Group 3 facsimile communication over IP networks. In accordance with the T.38 standard, the preferred system should therefore, provide packet fax data exchange service support at both the T.30 level (see ITU Recommendation T.30—"Procedures for Document Facsimile Transmission in the General Switched Telephone Network", 1988) and the T4 level (see ITU Recommendation T.4—"Standardization of Group 3 Facsimile Apparatus For Document Transmission", 1998), the contents of each of these ITU recommendations being incorporated herein by reference as if set forth in full. One function of the packet fax data exchange service is to relay the set up (capabilities) parameters in a timely fashion. Spoofing may be needed at either or both the T.30 and T.4 levels to maintain the fax session while set up parameters are negotiated at each of the network gateways and relayed in the presence of network delays and jitters.

In accordance with the industry T.38 recommendations for real time Group 3 communication over Internet Protocol (IP) networks, the described exemplary embodiment relays all information including; T.30 preamble indications (flags), T.30 message data, as well as T.30 image data between the network gateways. The T.30 relay logic 150 in the sending and receiving network gateways then negotiate parameters as if connected via a PSTN line. The T.30 relay logic 150 interfaces with the V.21 data pump 148 and the transmit and receive data pumps 156 and 170 as well as the packetization engine 152 and the depacketizing engine162 to ensure that the sending and the receiving fax machines 130 and 134 successfully and reliably communicate. The T.30 relay logic 150 provides local spoofing, using command repeats (CRP), and internal automatic repeat request (ARQ) mechanisms to handle delays associated with the packet based network. In addition, the T.30 relay logic 150 intercepts control messages to ensure compatibility of the rate negotiation between the near end and far end machines including HDLC processing, as well as lost packet recovery according to the T.30 ECM standard.

Figure 11:
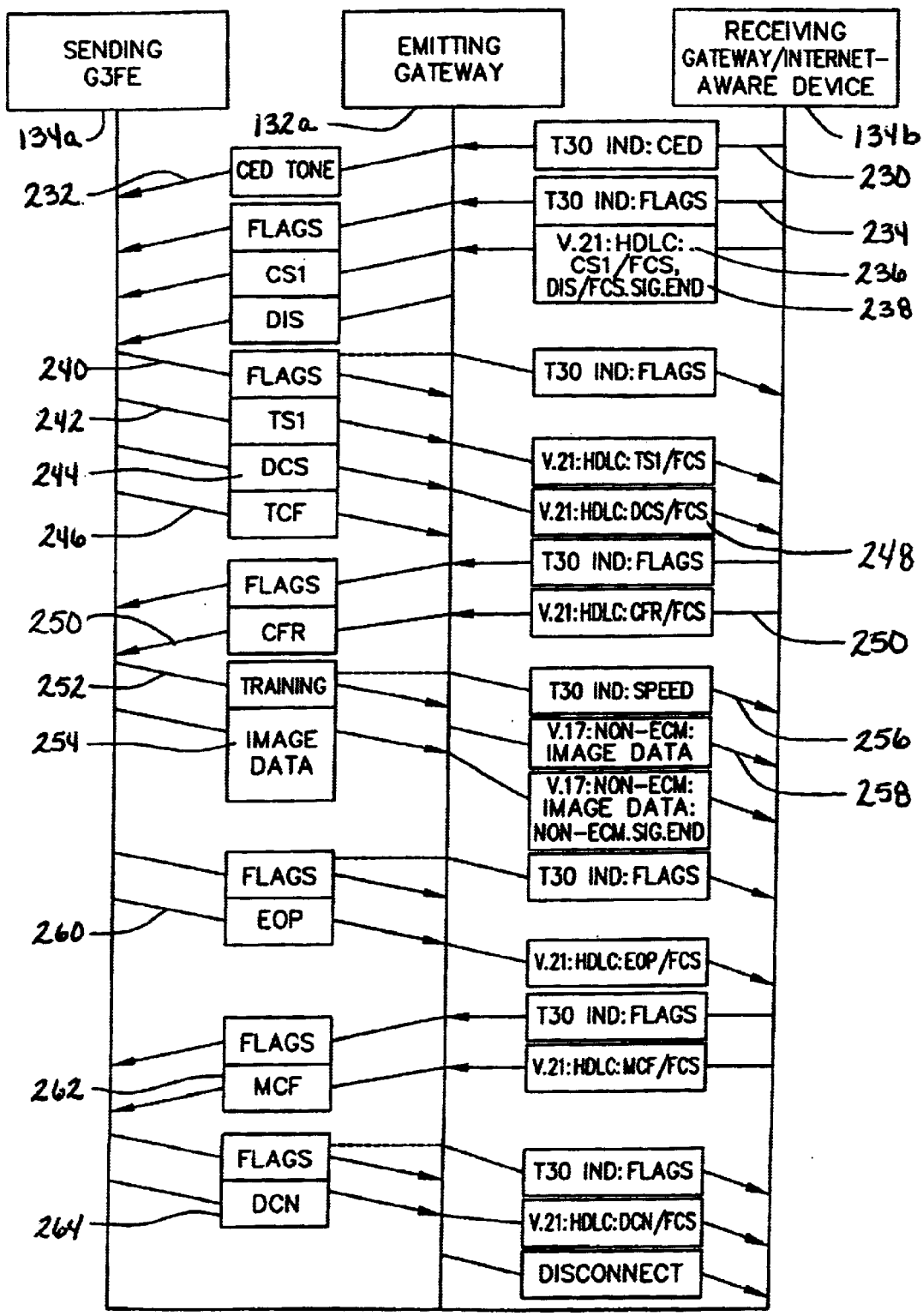
FIG. 11 is a diagram of the message flow for a fax relay in non error control mode in accordance with a preferred embodiment of the present invention.

FIG. 11 demonstrates message flow over a packet based network between a sending fax machine 134*a* (see FIG. 9) and the receiving fax device 134*b* (see FIG. 9) in non-ECM mode. The sending fax machine dials the sending network gateway 132*a* (see FIG. 9) which forwards CNG (not shown) to the receiving network gateway 132*b* (see FIG. 9). The receiving network gateway responds by alerting the receiving fax machine. The receiving fax machine answers the call and sends CED 230 tones. The CED tones are detected by the V.21 data pump 148 of the receiving network gateway which issues an event 232 indicating the receipt of CED which is then relayed to the emitting network gateway. In addition, the V.21 data pump of the receiving network gateway invokes the packet fax data exchange service.

The receiving network gateway now transmits T.30 preamble (HDLC flags) 234 followed by called subscriber identification (CSI) 236 and digital identification signals (DSI) 238. The emitting network gateway, receives a command 240 to begin transmitting CED. Upon receipt of CSI and DSI, the emitting network gateway begins sending subscriber identification (TSI) 242, digital command signal (DCS) 244 followed by training check (TCF) 246. The TCF 246 can be managed by one of two methods. The first method, referred to as the data rate management method one in T.38, generates TCF locally by the receiving gateway. CFR is returned to the sending fax machine 250, when the emitting network gateway receives a confirmation to receive (CFR) 248 from the receiving fax machine via the receiving network gateway, and the TCF training 246 from the sending fax machine is received successfully. In the event that the receiving fax machine receives a CFR and the TCF training 246 from the sending fax machine subsequently fails, then DCS 244 from the sending fax machine is again relayed to the receiving fax machine. The TCF training 246 is repeated until an appropriate rate is established which provides successful TCF training 246 at both ends of the network.

In a second method to synchronize the data rate, referred to as the data rate management method 2 in the T.38 standard, the TCF data sequence received by the emitting network gateway are forwarded from the sending fax machine to the receiving fax machine via the receiving network gateway. The sending and receiving fax machines and then perform speed selection as if connected via a regular PSTN.

Upon receipt of confirmation to receive (CFR) 250, the sending fax machine, transmits image data 254 along with its training preamble 252. The emitting network gateway receives the image data and forwards the image data 254 to the receiving network gateway. The receiving network gateway then sends its own training preamble 256 followed by the image data 258 to the receiving fax machine.

After each image page end of page (EOP), an EOP 260 and message confirmation (MCF) 262 messages are relayed between the sending and receiving fax machines. At the end of the final page, the receiving fax machine sends a message confirmation (MCF) 262, which prompts the sending fax machine to transmit a disconnect (DCN) signal 264. The call is then terminated at both ends of the network.

ECM fax relay message flow is similar to that described above. All preambles, messages and phase C HDLC data are relayed through the packet based network. Phase C HDLC data is de-stuffed and, along with the preamble and frame checking sequences (FCS), removed before being relayed so that only fax image data itself is relayed over the packet based network. The receiving network gateway performs bit stuffing and reinserts the preamble and FCS.

2. Spoofing Techniques

In the described exemplary embodiment, spoofing techniques are utilized at the T.30 and T.4 levels to manage extended network delays and jitter. Turning back to FIG. 10, the spoofing logic 172 includes built in timeouts for automatic requests for retransmission (ARQ). Automatic timeouts ensure that the connection is maintained in a system impaired by delay. T.30 spoofing is used to reset the T4 timer, defined in accordance with the ITU T.30 recommendations, to prevent a command or response retransmission. The T.30 relay logic 150 waits for a response to any transmitted message or command before continuing to the next state or phase. The T.30 relay logic 150 packages each message or command into a HDLC frame which includes preamble flags.

The sending and receiving network gateways 134a, 134b (See FIG. 9) spoof their respective fax machines 134a, 134b by locally transmitting preamble flags if a response from the packet based network is not received prior to T4 time out (3±0.15 sec). Preferably, the waiting period is less than about 2.7 sec, which has been empirically demonstrated to eliminate activation of the T4 timer for most fax machines. In addition, the maximum length of the preamble is limited to about 4.5 seconds. If a response from the packet based network arrives before the spoofing time out, each network gateway should preferably transmit a response message to its respective fax machine following the preamble flags. Each network gateway repeats the spoofing technique until a successful handshake is completed or its respective fax machine disconnects.

T.4 spoofing handles delay impairments during phase C signal reception. The composition of the phase C signal depends on whether ECM is being used, so that an appropriate spoofing method must be implemented for each mode. For those systems that do not utilize ECM, phase C signals consist of a series of coded image data followed by fill bits and end-of-line (EOL) sequences. Typically, fill bits are zeros inserted between the fax data signals and the EOL sequences. Fill bits ensure that a fax machine has time to perform the various mechanical overhead functions associated with any line it receives. Fill bits can also be utilized to spoof the jitter buffer in accordance with a spoofing method known as EOL spoofing. The number of the bits of coded image contained in the data signals associated with the scan line and transmission speed limit the number of fill bits that can be added to the data signals. Preferably, the maximum transmission of any coded scan line is limited to less than about 5 sec. Thus, if the coded image for a given scan line contains 1000 bits and the transmission rate is 2400 bps, then the maximum duration of fill time is (5−(1000+12)/2400)=4.57 sec.

Generally, the packet fax data exchange service utilizes spoofing if the network jitter delay exceeds the delay capability of the jitter buffer 166. In accordance with the EOL spoofing method, fill bits can only be inserted immediately before an EOL sequence, so that by necessity, the jitter buffer 166 must store at least one EOL sequence. Thus the jitter buffer 166 must be sized to hold at least one entire scan line of data to ensure the presence of at least one EOL sequence within the jitter buffer 166. Thus, depending upon transmission rate, the size of the jitter buffer 166 can become prohibitively large. The table below summarizes the required jitter buffer data space to perform EOL spoofing for various scan line lengths. The table assumes that each pixel is represented by a single bit. The values represent an approximate upper limit on the required data space, but not the absolute upper limit, because in theory at least, the longest scan line can consist of alternating black and white pixels which would require an average of 4.5 bits to represent each pixel rather than the one to one ratio summarized in the table.

| Scan Line Length | Number of words | sec to print out at 2400 | sec to print out at 4800 | sec to print out at 9600 | sec to print out at 14400 |
| --- | --- | --- | --- | --- | --- |
| 1728 | 108 | 0.72 | 0.36 | 0.18 | 0.12 |
| 2048 | 128 | 0.853 | 0.427 | 0.213 | 0.14 |
| 2432 | 152 | 1.01 | 0.507 | 0.253 | 0.17 |
| 3456 | 216 | 1.44 | 0.72 | 0.36 | 0.24 |
| 4096 | 256 | 2 | 0.853 | 0.43 | 0.28 |
| 4864 | 304 | 2.375 | 1.013 | 0.51 | 0.34 |

To ensure the jitter buffer 166 stores an EOL sequence the spoofing logic 172 is activated when the number of data packets stored in the jitter buffer 166 drops to a threshold level. Typically, a threshold value of about 200 msec is used to support the most commonly used fax setting, namely a fax speed of 9600 bps and scan line length of 1728. An alternate spoofing method should be used if an EOL sequence is not contained within the jitter buffer 166, otherwise the call will have to be terminated. An alternate spoofing method uses zero run length code words. This method requires real time image data decoding so that the word boundary is known. Advantageously, this alternate method reduces the required size of the jitter buffer 166.

In error correction mode, phase C signals consist of HDLC frames so that HDLC spoofing can be used. The jitter buffer 166 must be sized to store at least one HDLC frame so that a frame boundary may be located. The length of the largest T.4 ECM HDLC frame is 260 octets or 130 16-bit words. Again, spoofing is activated when the number of packets stored in the jitter buffer 166 drops to a predetermined threshold level. When spoofing is required, the spoofing logic 172 adds HDLC flags at the frame boundary as a complete frame is being reassembled and forwarded to the transmit fax data pump 170. This continues until the number of data packets in the jitter buffer 166 exceeds the threshold level.

Simply increasing the storage capacity of the jitter buffer 166 can minimize the need for spoofing. However, overall network delay increases when the size of jitter buffer 166 is increased. This delay may complicate the T.30 negotiation at the end of page or end of document, because of susceptibility to time out. Such a situation arises when the sending fax machine completes the transmission of high speed data, and switches to an HDLC phase and sends the first V.21 packet in phase D. The sending fax machine must be kept alive until the response to the V.21 data packet is received. The receiving fax device requires more time to flush a large jitter buffer 166 and then respond, hence complicating the T.30 negotiation.

In addition, the length of time a fax machine can be spoofed is limited, so that the jitter buffer 166 can not be arbitrarily large. A pipelined store and forward relay is a combination of store and forward and spoofing techniques to approximate the performance of a typical-Group 3 fax connection when the network delay is large (on the order of seconds or more). One approach is to store and forward a single page at a time. However, this approach requires a significant amount of memory (10 Kwords or more). One approach to reduce the amount of memory required entails discarding scan lines on the sending network gateway and performing line repetition on the receiving network gateway so as to maintain image aspect ratio and quality.

Alternatively, a partial page can be stored and forwarded thereby reducing the required amount of memory.

The sending and receiving fax machines will have some minimal differences in clock frequency. ITU standards recommends a data pump data rate of +100 ppm, so that the clock frequencies between the receiving and sending fax machines could differ by up to 200 ppm.

Therefore, the data rate at the receiving network gateway (jitter buffer 166) can build up or deplete at a rate of 1 word for every 5000 words received. Typically a fax page is less than 1000 words so that end to end clock synchronization is not a problem.

C. Data Relay Mode

Figure 12:
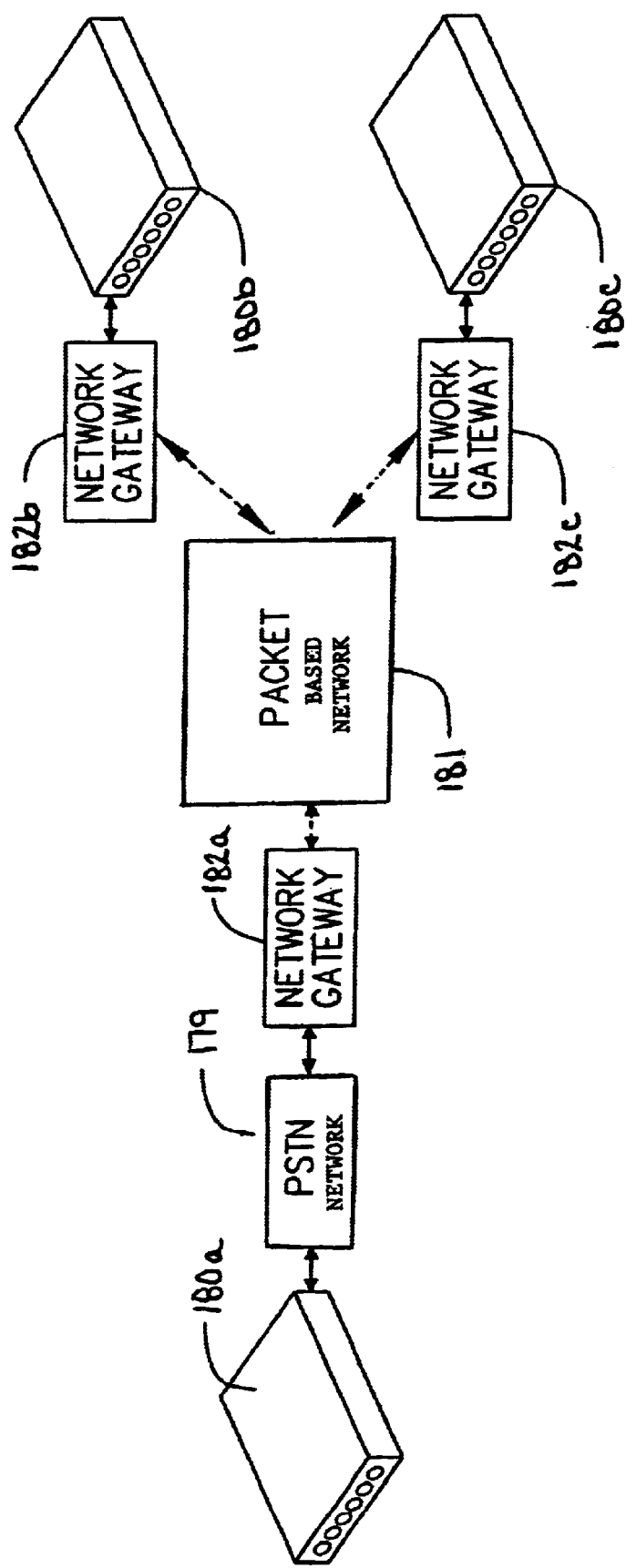
FIG. 12 is a block diagram of several signal processing systems in the modem relay mode for interfacing a number of telephony devices with a packet based network in accordance with a preferred embodiment of the present invention.

Data relay mode provides signal processing of data signals. As shown in FIG. 12, data relay mode enables the transmission of data signals over a packet based system such as VoIP, VoFR, FRF-11, VTOA, or any other proprietary network. The data relay mode should also permit data signals to be carried over traditional media such as TDM. Network gateways 182a, 182b, 182c, the operating platform for the signal processing system in the described exemplary embodiment, support the exchange of data signals between a packet based network 181 and various data modems 180a, 180b, 180c. For the purposes of explanation, the first modem is a calling modem 180a. The calling modem 180a is connected to the calling network gateway 182a through a PSTN line. The calling network gateway 182a is connected to a packet based network 181. Additional modems 180b, 180c are at the other end of the packet based network 181 and include answer modems 180b, 180c and answer network gateways 182b, 182c. The answer network gateways 182b, 182c provide a direct interface between their respective modem 180b, 180c and the packet based network 181.

In data relay mode, a local modem connection is established on each end of the packet based network 181. That is, the calling modem 180a and the calling network gateway 182a establish a local modem connection, as does the destination answer modem 180b and its respective answer network gateway 182b. Next, data signals are relayed across the packet based network 181. The calling network gateway 182a demodulates the modem data signal and generates a formatted signal appropriate for the packet based network 181. The answer network gateway 182b compensates for network impairments and re-modulates the encoded data in a format suitable for the destination answer modem 180b. This approach results in considerable bandwidth savings since only the underlying unmodulated data signals are transmitted across the packet based network.

In the data relay mode, the packet data modem exchange service provides demodulation and modulation of data signals. The packet data modem exchange also provides compensation for network jitter with a jitter buffer similar to that invoked in the packet voice exchange service. Additionally, the packet data modem exchange service compensates for system clock jitter between the near end and far end modems with a dynamic phase adjustment and resampling mechanism. Spoofing may also be provided during various stages of the call negotiation procedure between the modems to keep the connection alive.

Figure 13:
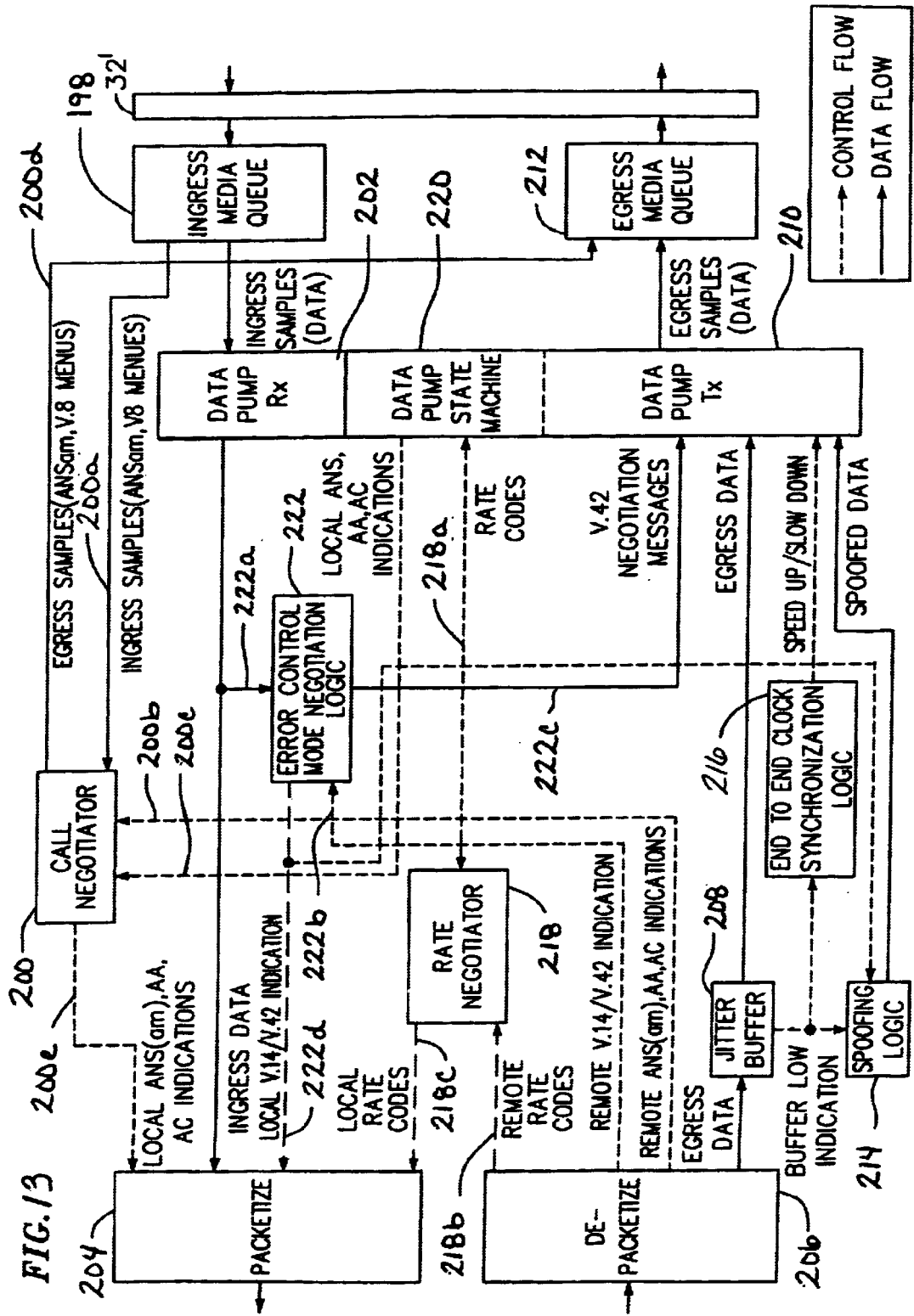
FIG. 13 is a system block diagram of a signal processing system operating in a modem relay mode in accordance with a preferred embodiment of the present invention.

The packet data modem exchange service invoked by the network VHD in the data relay mode is shown schematically in FIG. 13. In the described exemplary embodiment, a connecting PXD (not shown) connecting the modem to the switch board 32' is transparent, although those skilled in the art will appreciate that various signal conditioning algorithms could be programmed into PXD such as filtering, echo cancellation and gain.

After the PXD, the data signals are coupled to the network VHD via the switchboard 32'. The packet data modem exchange provides two way communication between a circuit switched network and packet based network with two basic functional units, a demodulation system and a re-modulation system. In the demodulation system, the network VHD exchanges data signals from a circuit switched network, or a telephony device directly, to a packet based network. In the re-modulation system, the network VHD exchanges data signals from the packet based network to the PSTN line, or the telephony device.

In the demodulation system, the data signals are received and buffered in an ingress media queue 198. A call negotiator 200 determines the type of modem connected locally via a circuit switched network, such as a PSTN line carrying data signals modulated by a voiceband carrier (e.g., 8 KHz.), as well as the type of modem connected remotely via a packet based network. The call negotiator 200 utilizes V.25 automatic answering procedures and V.8 auto-baud software to automatically detect modem capability. The call negotiator 200 receives the data signals 200a (ANSam and V.8 menus) from the ingress media queue 198, as well as AA, AC and other message indications 220b from the local modem via a data pump state machine 220, to determine the type of modem in use locally. The call negotiator also receives ANSam, AA, AC and other indications from a remote modem (not shown) located on the opposite end of the packet based network via a depacketizing engine 206. The call negotiator 200 relays ANSam answer tones and other indications 200d to a local modem (not shown) via an egress media queue 212 of the modulation system. The call negotiator 200 relays ANSam answer tones and other indications 200e to the remote modem via a packetization engine 204.

A data pump receiver 202 demodulates the data signals from the ingress media queue 198. The data pump receiver 202 supports the V.22bis standard for the demodulation of data signals at 1200/2400 bps; the V.32bis standard for the demodulation of data signals at 4800/7200/9600/12000/14400 bps, as well as the V.34 standard for the demodulation of data signals up to 33600 bps. Moreover, the V.90 standard may also be supported. The demodulated data signals are then packetized by the packetization engine 204 and transmitted across the packet based network.

In the re-modulation system, packets of data signals from the packet based network are first de-packetized by the depacketizing engine 206 and stored in a jitter buffer 208. A data pump transmitter 210 modulates the buffered data signals with a voiceband carrier. The modulated samples are in turn stored in the egress media queue 212 before being output to the PXD (not shown) via the switchboard 32'. The data pump transmitter 210 supports the V.22bis standard for the transfer of data signals at 1200/2400 bps; the V.32bis standard for the transfer of data signals at 4800/7200/9600/12000/14400 bps, as well as the V.34 standard for the transfer of data signal up to 33600 bps. Moreover, the V.90 standard may also be supported.

During jitter buffer underflow, the jitter buffer 208 sends a buffer low indication 208a to spoofing logic 214. When the spoofing logic 214 receives the buffer low signal indicating that the jitter buffer 208 is operating below a pre-determined threshold level, it inserts spoofed data at the appropriate place in the data signal via the data pump transmitter 210. Spoofing continues until the jitter buffer 208 is filled to the pre-determined threshold level, at which time data signals are again transferred from the jitter buffer 208 to the data pump transmitter 210.

An end to end clock synchronizer 216 also monitors the state of the jitter buffer 208. The clock synchronizer 216 controls the data transmission rate of the data pump transmitter 210 in correspondence to the state of the jitter buffer 208. When the jitter buffer 208 is below a pre determined threshold level, the clock synchronizer 216 reduces the transmission rate of the data pump transmitter 210. Likewise, when the jitter buffer 208 is above a pre-determined threshold level, the clock synchronizer 216 increases the transmission rate of the data pump transmitter 210.

A rate negotiator 218 synchronizes the connection rates at the network gateways 182a, 182b, 182c (see FIG. 12). The rate negotiator receives rate control codes 218a from the local modem via the data pump state machine 220 and rate control codes 218b from the remote modem via the depacketizing engine 206. The rate negotiator 218 forwards the remote rate control codes 218a received from the remote modem to the local modem via commands sent to the data pump state machine 220. The rate negotiator 218 forwards the local rate control codes 218c received from the local modem to the remote modem via the packetization engine 204. Based on the exchanged rate codes the rate negotiator 218 establishes a common data rate between the calling and answering modems. During the data rate exchange procedure, the jitter buffer 208 should be disabled by the rate negotiator 218 to prevent data transmission between the call and answer modems until the data rates are successfully negotiated.

An error control synchronizer 222 performs a similar function by ensuring that the network gateways utilize a common error protocol. The error control synchronizer 222 processes local error control messages 222a from the data pump receiver 202 in addition to remote V.14/V.42 indications 222b from the depacketizing engine 206. The error control synchronizer 222 forwards V. 14/V.42 negotiation messages 222c to the local modem via the data pump transmitter 210. The error control synchronizer 222 forwards V.14/V.42 indications 222d from the local modem to the remote modem via the packetization engine 204.

The packet data modem exchange service preferably utilizes indication packets as a means for communicating answer tones, AA, AC and other indication signals across the packet based network 10. However, the packet data modem exchange service supports data pumps such as V.22bis and V.32bis which do not include a well defined error recovery mechanism, so that the modem connection may be terminated whenever indication packets are lost. Therefore, either the packet data modem exchange or upper application layer should ensure proper delivery of indication packets when operating in a network environment that does not guarantee packet delivery.

The packet data modem exchange service can ensure delivery of the indication packets by periodically re-transmitting the indication packet until some expected packets are received. For example, in V.32bis relay the call negotiator operating under the packet data modem exchange on the answer network gateway periodically re-transmits ANSam answer tones from the answer modem to the calling modem, until the calling modem connects to the line and transmits carrier state AA.

Alternatively, the packetization engine can embed the indication information directly into the packet header. In this approach the indication information is included in all packets transmitted across the packet based network, so that the system does not rely on the successful transmission of individual indication packets. Rather, if a given packet is lost, the next arriving packet contains the indication information in the packet header. Both methods increase the traffic across the network. However, it is preferable to periodically re-transmit the indication packets because it has less of a detrimental impact on network traffic.

1. End to End Clock Synchronization

Slight differences in the clock frequency of the calling modem and the answer modem are expected, since the baud rate tolerance for a typical modem data pump is ±100 ppm. This tolerance corresponds to a relatively low depletion or build up rate of 1 in 5000 words. However, the length of a modem session can be very long, so that uncorrected difference in clock frequency can result in jitter buffer underflow or overflow.

In an exemplary embodiment, the packet data modem exchange synchronizes the transmit clock of each network gateway to the average rate at which data packets arrive at their respective jitter buffer. The data pump transmitter 210 examines the egress media queue 212 at the beginning of each frame. In accordance with the remaining buffer space, data pump transmitter 210 modulates that number of digital data samples required to produce a total of slightly more or slightly less than 80 samples per frame, assuming that the data pump transmitter 210 is invoked once every 10 msec. The data pump transmitter 210 gradually adjusts the number of samples per frame to allow the receiving modem to adjust to the timing change. Typically, the data pump transmitter 210 uses an adjustment rate of about one ppm. In addition, the maximum adjustment rate should be less than about 200 ppm.

In the described exemplary embodiment, end to end clock synchronizer 216 monitors the space available within the jitter buffer 208 and utilizes water marks to determine whether the data rate of the data pump transmitter 210 should be adjusted. Network jitter may cause timing adjustments to be made. However, this should-not adversely affect the data pump receiver of the answering modem as these timing adjustments are made very gradually.

2. Rate Synchronization.

Rate synchronization refers to the process by which two telephony devices are connected at the same data rate prior to data transmission. In the context of a modem connection in accordance with an exemplary embodiment of the present invention, each modem is coupled to a signal processing system, which for the purposes of explanation is operating in a network gateway, either directly or through a PSTN line. In operation, each modem establishes a modem connection with its respective network gateway, at which point, the modems begin relaying data signals across a packet based network. The problem that arises is that each modem may negotiate a different data rate with its respective network gateway, depending on the line conditions and user settings. In this instance, the data signals transmitted from one of the modems will enter the packet based network faster than it can be extracted at the other end by the other modem. The resulting overflow of data signals may result in a lost connection between the two modems. To prevent data signal overflow, it is, therefore, desirable to ensure that both modems negotiate to the same data rate. A rate negotiator can be used for this purpose. Although the rate negotiator is described in the context of a signal processing system with the packet data modem exchange service invoked, those skilled in the art will appreciate that the rate negotiator is likewise suitable for various other telephony and telecommunications application. Accordingly, the described exemplary embodiment of the rate negotiator in a signal processing system is by way of example only and not by way of limitation.

In an exemplary embodiment, data rate synchronization is achieved through a data rate negotiation procedure, wherein a calling modem independently negotiates a data rate with a calling network gateway, and a answer modem independently negotiates a data rate with a answer data relay. The calling and answer network gateways, each having a signal processing system running a packet exchange service, then exchange data packets containing information on the independently negotiated data rates. If the independently negotiated data rates are the same, then each rate negotiator will enable its respective network gateway and data transmission between the call and answer modems will commence. Conversely, if the independently negotiated data rates are different, the rate negotiator will renegotiate the data rate by adopting the lowest of the two data rates. The call and answer modems will then undergo retraining or rate re-negotiation procedures by their respective network gateways to establish a new connection at the renegotiated data rate. The advantage of this approach is that the data rate negotiation procedure takes advantage of existing modem functionality, namely, the retraining mechanism, and puts it to alternative usage. Moreover, by retraining both the call and answer modem (one modem will already be set to the renegotiated rate) the modem connection should not be lost due to timeout.

In an alternate method for rate synchronization, the calling and answer modems can directly negotiate the data rate. This method is not preferred for modems with time constrained handshaking sequences such as, for example, modems operating in accordance with the V.22bis or the V.32bis standards. The round trip delay accommodated by these standards could cause the modem connection to be lost due to timeout. Instead, retrain or rate renegotiation should be used for data signals transferred in accordance with the V.22bis and V.32bis standards, whereas direct negotiation of the data rate by the local and remote modems can be used for data exchange in accordance with the V.34 and V.90 (a digital modem and analog modem pair for use on PSTN lines at data rates up to 56,000 bps downstream and 33,600 upstream) standards.

A single industry standard for the transmission of modem data over a packet based network does not exists. However, numerous common standards exists for transmission of modem data at various data rates over the public switched telephone network. For example, V.22 is a common standard used to define operation of 1200 bps modems. Data rates as high as 2400 bps can be implemented with the V.22bis standard (the suffix "bis" indicates that the standard is an adaptation of an existing standard). The V.22bis standard groups data into four bit words which are transmitted at 600 baud. The V.32 standard supports full duplex, data rates of up to 9600 bps over the general switched telephone network. A V.32 modem groups data into four bit words and transmits at 2400 baud. The V.32bis standard supports duplex modems operating at data rates up to 14,400 bps on the general switched telephone network. In addition, the V.34 standard supports data rates up to 33,600 bps on the general switched telephone network.

V.42 is a standard error correction technique using advanced cyclical redundancy checks and the principle of automatic repeat requests (ARQ). In accordance with the V.42 standard, transmitted data is grouped into blocks and cyclical redundancy calculations add error checking words to the transmitted data stream. The receiving modem calculates new error check information for the data block and compares the calculated information to the received error check information. If the codes match, the received data is valid and another transfer takes place. If the codes do not match, an transmission error has occurred and the receiving modem requests a repeat of the last data block. This repeat cycle continues until valid data has been received.

Various voiceband data modem standards exist for error correction and data compression. V.42bis and MNP5 are examples of data compression standards. The handshaking sequence for every modem standard is different so that the packet data modem exchange service should support numerous data transmission standards as well as numerous error correction and data compression techniques.

a. V.22 Rate Synchronization

The call negotiator, operating under the packet data modem exchange on the answer network gateway, differentiates between modem types and relays the ANSam answer tone. The answer modem transmits unscrambled binary ones signal (USB 1) indications to the answer mode gateway. The answer network gateway forwards USB 1 signal indications to the calling network gateway. The call negotiator operating under the packet data modem exchange service on the calling network gateway assumes operation in accordance with the V.22bis standard and terminates the call negotiator. The packet data modem exchange service, operating on the answer network gateway, invokes operation in accordance with the V.22bis standard after an answer tone timeout period and terminates the call negotiator 200.

V.22bis handshaking does not utilize rate messages or signaling to indicate the selected bit rate as with most high data rate pumps. Rather, the inclusion of a fixed duration signal (S1) indicates that 2400 bps operation is to be used. In addition, the absence of such a tone indicates that 1200 bps should be selected. The duration of the signal is typically about 100 msec, making it likely that the calling modem will perform rate determination (assuming that it selects 2400 bps) before rate indication from the answer modem arrives. Therefore, the rate negotiator within the packet data modem exchange operating in the calling network gateway should select 2400 bps operation and proceed with the handshaking procedure. If the answer modem is limited to a 1200 bps connection, rate re-negotiation is typically used to change the operational data rate of the calling modem to 1200 bps. In this case, if the calling modem selects 1200 bps, rate re negotiation would not be required.

b. V.32bis Rate Synchronization

Figure 14:
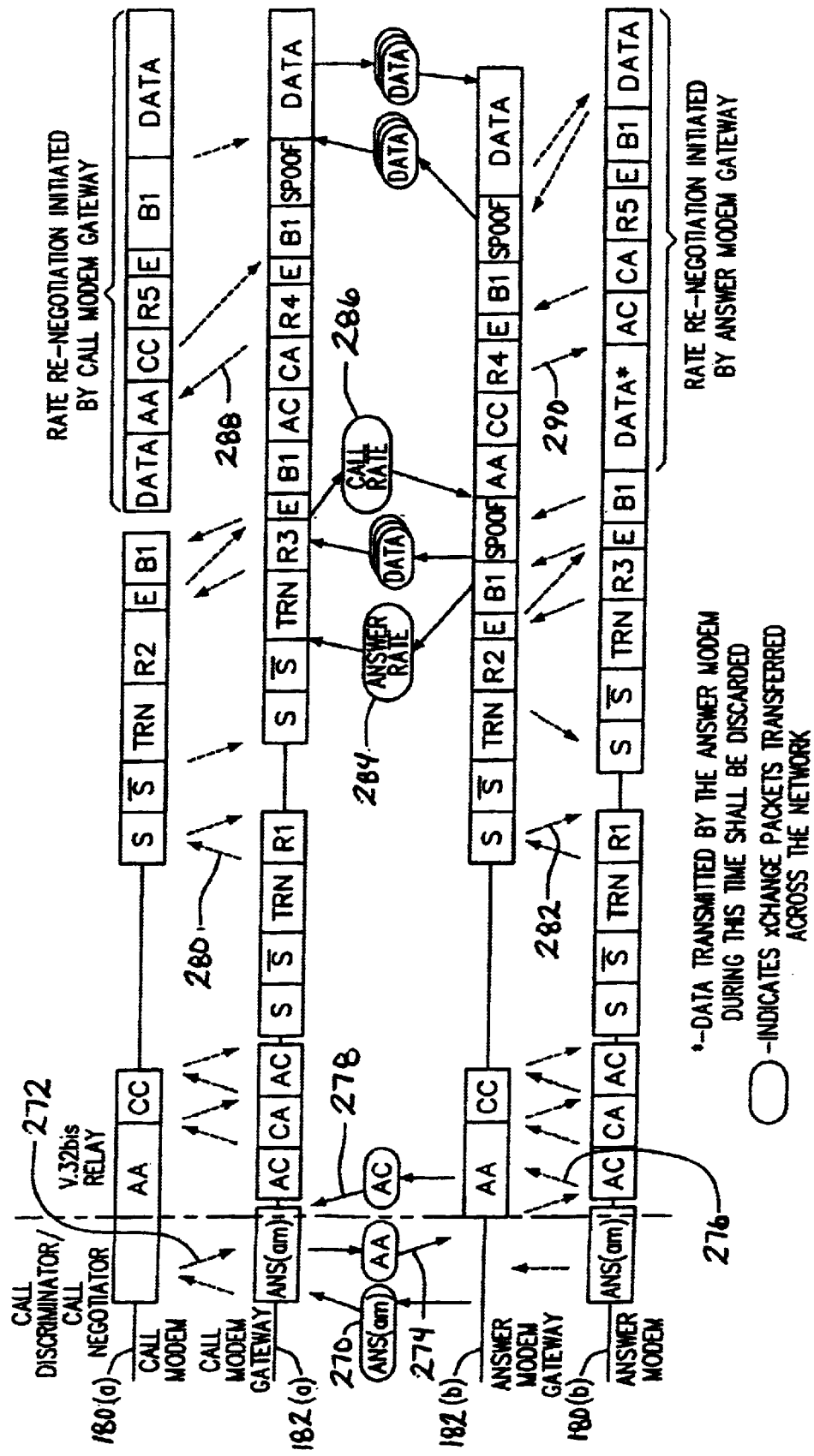
FIG. 14 is a diagram of a relay sequence for V.32bis rate synchronization using rate re-negotiation in accordance with a preferred embodiment of the present invention.

V34bis handshaking utilizes rate signals (messages) to specify the bit rate. A typical relay sequence in accordance with the V.32bis standard is shown in FIG. 14 and begins with the call negotiator operating under the packet data modem exchange in the answer network gateway relaying ANSam 270 answer tone from the answer modem to the calling modem. After receiving the answer tone for a period of at least one second, the calling modem connects to the line and repetitively transmits carrier state A 272. When the calling network gateway detects AA, the calling network gateway relays this information to the answer network gateway. The packet data modem exchange operating on the answer network gateway invokes operation in accordance with the V.32bis standard upon receipt of AA indication. The answer modem then transmits alternating carrier states A and C. If answer network gateway receives AC from the answer modem, the answer network gateway relays it to the calling network gateway; thereby establishing operation in accordance with the V.32bis standard, allowing call negotiator operating under the packet data modem exchange in the calling network gateway to be terminated. Next, data rate alignment is achieved by either of two methods.

In the first method for data rate alignment of a V.32bis relay connection, the calling modem and the answer modem independently negotiate a data rate at each end of the network 280 and 282. Each network gateway forwards a connection data rate indication 284 and 286 to the other network gateway. Each network gateway compares the far end data rate to its own data rate. The preferred rate is the minimum of the two rates. Rate re-negotiation 288 and 290 is invoked if the connection rate of either network gateway differs from the preferred rate.

Figure 15:
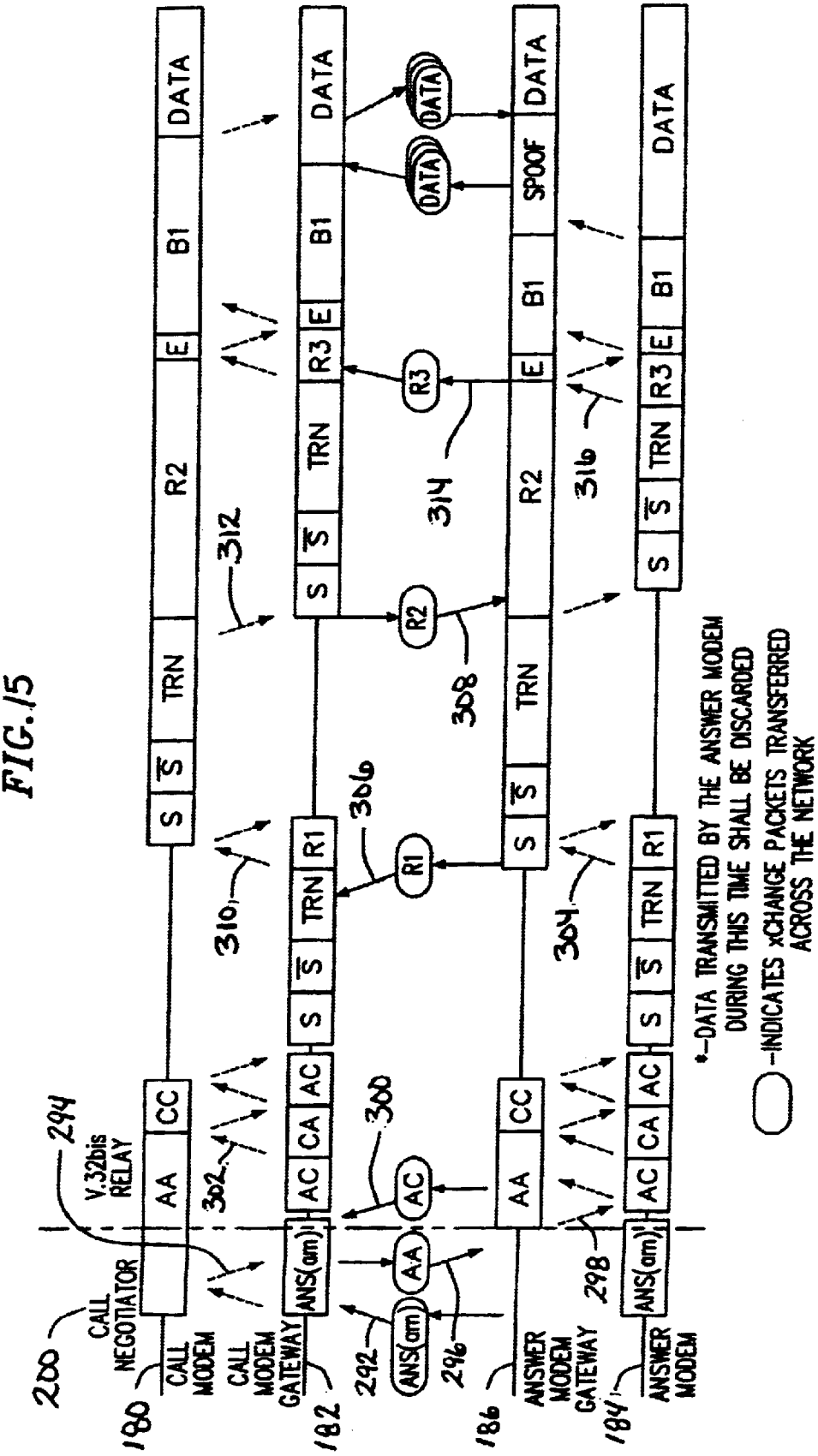
FIG. 15 is a diagram of an alternate relay sequence for V.32bis rate synchronization whereby rate signals are used to align the connection rates at the two ends of the network without rate re-negotiation in accordance with a preferred embodiment of the present invention.
Figure 3:
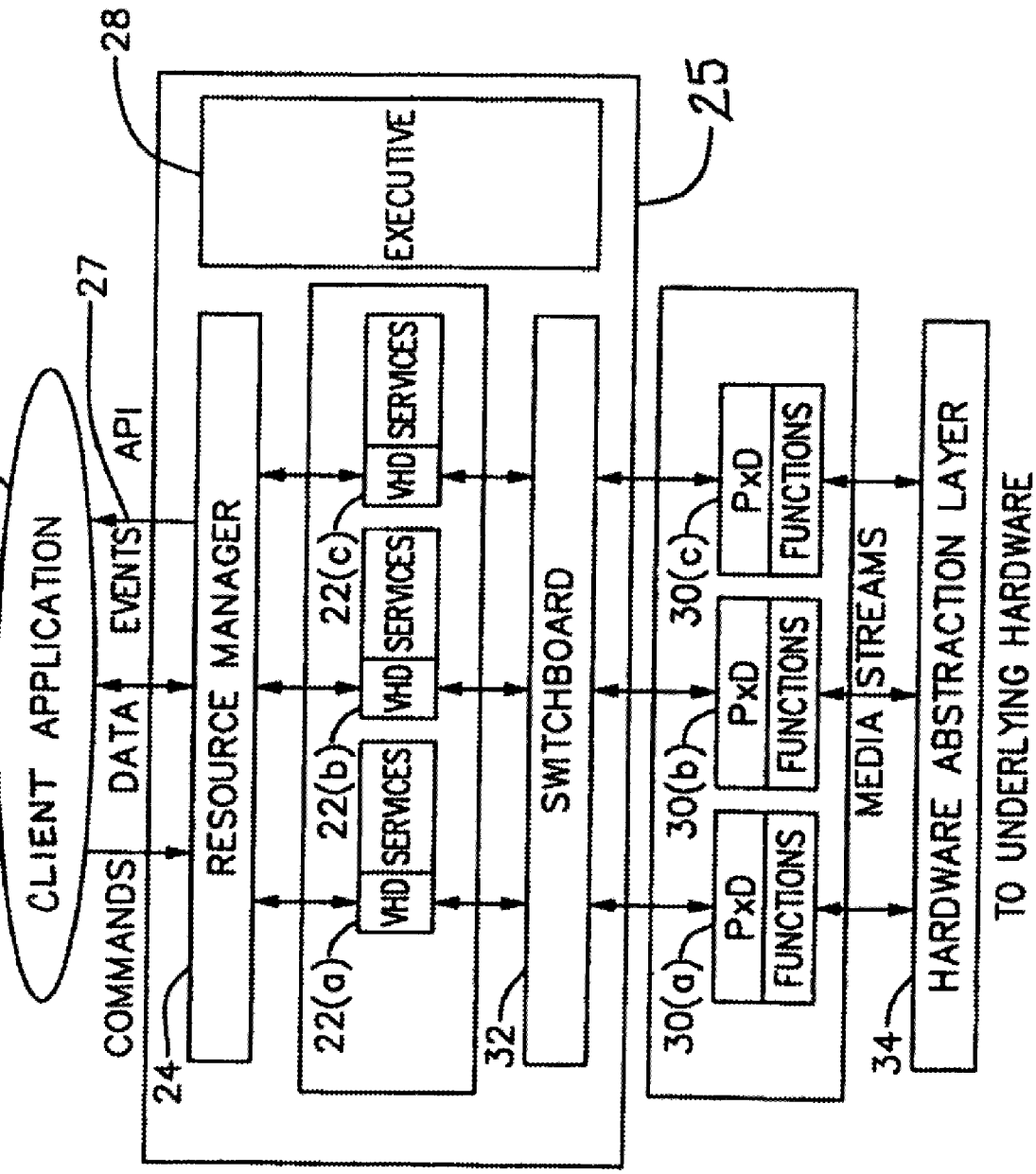
Figure 13:
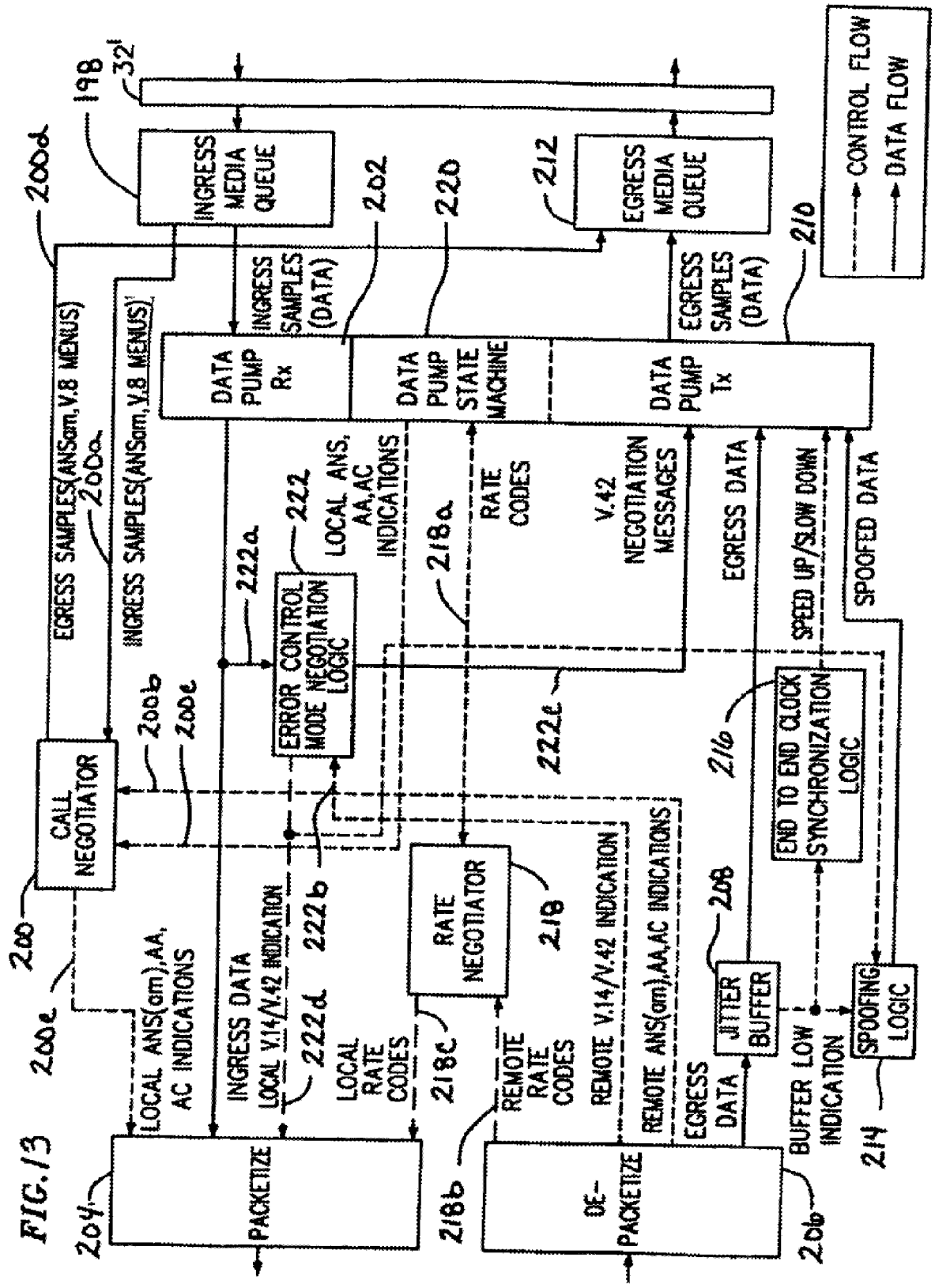

In the second method, rate signals R1, R2 and R3, are relayed to achieve data rate synchronization. FIG. 15 shows a relay sequence in accordance with the V.32bis standard for this alternate method of rate synchronization. The call negotiator relays the answer tone (ANSam) 292 from the answer modem to the calling modem. When the calling modem detects answer tone it repetitively transmits carrier state A 294, the calling network gateway relays this information (AA) 296 to the answer network gateway. The answer network gateway sends AA 298 to the answer modem which initiates normal range tone exchange with the answer modem. The answer network gateway forwards AC 300 to calling network gateway which in turn relays this information 302 to the calling modem to initiate normal range tone exchange with the calling modem.

The answer modem sends its first training sequence 304 followed by R1 to the rate negotiator operating in the answer network gateway. When the answer network gateway receives R1, it forwards R1 306 to the calling network gateway via the packetization engine operating in the answer network gateway. The answer network gateway repetitively sends training sequences to the answer modem, until receiving an R2 indication 308 from the calling modem, and the training result of the calling network gateway (formatted as a rate signal). The calling network gateway forwards the R1 indication 310 of the answer modem to the calling modem. The calling modem sends training sequences to calling network gateway 312. The calling network gateway determines the data rate capability of the calling modem, and forwards this training result to the answer network gateway in a data rate signal format. The calling modem sends R2 308 to the calling network gateway which forwards it to the answer network gateway. The calling network gateway sends training sequences to the calling modem until receiving an R3 signal 314 from the answer modem via the answer network gateway.

The answer network gateway performs a logical AND operation on the R1 signal from the answer modem, the R2 signal from the calling modem and the training sequences of the calling network gateway to create a second rate signal R2 316, which is forwarded to the answer modem. The answer modem sends its second training sequence followed by R3. The answer network gateway relays R3 314 to the calling network gateway which forwards it to the calling modem and begins operating at the R3 specified bit rate. However, this method of rate synchronization is not preferred for V.32bis due to time constrained handshaking.

c. V.34 Rate Synchronization

Data transmission in accordance with the V.34 standard utilizes a modulation parameter (MP) sequence to exchange information pertaining to data rate capability. The MP sequences can be exchanged end to end to achieve data rate synchronization. Initially, the call negotiator operating under the packet data modem exchange in the answer network gateway relays the answer tone (ANSam) from the answer modem to the calling modem. When the calling modem receives answer tone, it generates a CM indication. When the calling network gateway receives a CM indication, it forwards it to the answer network gateway which then communicates the CM indication with the answer modem. The answer modem then responds with JM, which is relayed to the calling modem via the calling network gateway. If the calling network gateway then receives CJ, the call negotiator operating under the packet data modem exchange, on the calling network gateway, initiates operation in accordance with the V.34 standard, and forwards a CJ indication to the answer network gateway. If the JM menu calls for V.34, the call negotiator operating under the packet data modem exchange on the answer network gateway initiates operation in accordance with the V.34 standard and the call negotiator is terminated. If a standard other than V.34 is called for, the appropriate procedure is invoked, such as those described previously for V.22 or V.32bis.

After a V.34 relay connection is established, the calling modem and the answer modem freely negotiate a data rate at each end of the network with the packet data modem exchange service operating on their respective network gateways. Each network gateway forwards a connection rate indication to the other gateway. Each gateway compares the far end bit rate to the rate transmitted by each gateway. The preferred rate is the minimum of the two rates. Rate re-negotiation is invoked if the connection rate at the calling or receiving end differs from the preferred rate, to force the connection to the desired rate.

In an alternate method for V.34 rate synchronization MP sequences are utilized to achieve rate synchronization without rate re-negotiation. The calling modem and the answer modem independently negotiate with the calling network gateway and the answer network gateway respectively. The calling network gateway and the answer network gateway exchange training results in the form of MP sequences when Phase IV of the independent negotiations is reached. However, the calling network gateway and the answer network gateway are prevented from relaying MP sequences to the calling modem and the answer modem respectively until the training results for both network gateways and the MP sequences for both modems are available. If symmetric rate is enforced, the maximum answer data rate and the maximum call data rate of the four MP sequences are compared. The lower data rate of the two maximum rates is the preferred data rate. Each network gateway sends the-MP sequence with the preferred rate to it's respective modem so that the calling and answer modems operate at the preferred data rate.

If asymmetric rates are supported, then the preferred call-answer data rate is the lesser of the two highest call-answer rates of the four MP sequences. Similarly, the preferred answer-call data rate is the lesser of the two highest answer-call rates of the four MP sequences. Data rate capabilities may also need to be modified when the MP sequence are formed so as to be sent to the calling and answer modems. The MP sequence sent to the calling and answer modems, is the logical AND of the data rate capabilities from the four MP sequences.

d. V.90 Rate Synchronization

The V.90 standard utilizes a digital and analog modem pair to transmit modem data over the PSTN line. The V.90 standard utilizes MP sequences to convey training results from a digital to an analog modem, and a similar sequence, using constellation parameters (CP) to convey training results from an analog to a digital modem. Under the V.90 standard, the timeout period is 15 seconds compared to a timeout period of 30 seconds under the V.34 standard. In addition, the analog modems control the handshake timing during training. In an exemplary embodiment, the calling modem and the answer modem are the V.90 analog modems. As such the calling modem and the answer modem are beyond the control of the network gateways during training. The digital modems control the timing during transmission of TRN1d. The digital modem uses TRN1d to train its echo canceller.

When operating in accordance with the V.90 standard, the call negotiator utilizes the V.8 recommendations for initial negotiation. Thus, the invocation of the V.90 relay session is the same as that described for the V.34 standard. There are two configurations where V.90 relay may be used. The first configuration is data relay between two V.90 analog modems, i.e. the two network gateways are both configured as V.90 digital modems. The upstream rate according to the V.90 standard is limited to 33,600 bps. Thus, the maximum data rate for an analog to analog relay is 33,600 bps. The minimum data rate for a V.90 digital gateway will support is 28,800 bps. Therefore, the connection must be terminated if the maximum data rate for one or both of the upstream directions is less than 28,800 bps, and one or both the downstream direction is in V.90 digital mode. Therefore, the V.34 relay is preferred over V.90 analog to analog data relay.

A second configuration is a connection between a V.90 analog modem and a V.90. digital modem. A typical example of such a configuration is when a user within a packet based PABX system dials out into a remote access server (RAS) or an Internet service provider (ISP) that uses a central site modem for physical access that is V.90 capable. The connection from PABX to the central site modem may be either through PSTN or directly through an ISDN, T1 or E1 interface. Thus the V.90 embodiment should support an analog modem interfacing directly to ISDN, T1 or E1.

For analog to digital modem connection, the connections at both ends of the packet based network should be either digital or analog to achieve proper rate synchronization. The analog modem decides whether to select digital mode as specified in INFO1a, so that INFO1a should be relayed from end to end before operation mode can be synchronized. The relay sequence for achieving mode alignment is as follows. The calling network gateway receives an INFO1a signal from the calling modem. The calling network gateway sends a mode indication to the answer network gateway indicating whether digital or analog will be used. Operation then begins in the mode specified in INFO1a. The answer modem sends a signal to the answer network gateway. The answer network gateway performs line probe processing on this signal to determine whether digital mode can be used. Upon receipt of the mode indication signal from the calling network gateway, the answer network gateway sends an INFO1a sequence to the answer modem. If analog mode is indicated, the answer network gateway proceeds with analog mode operation. If digital mode is indicated and digital mode can be supported by the answer modem, the answer network gateway sends an INFO1a sequence to the answer modem indicating that digital mode is desired and proceeds with digital mode operation.

Alternatively, if digital mode is indicated and digital mode can not be supported by the answer modem, the calling modem must be forced into analog mode by one of three alternate methods. First, some commercially available V.90 analog modems may revert to analog mode after several retrains. Thus, one solution is to force retrains until the calling modem selects analog mode operation. In an alternate method, the call network gateway modifies its line probe so as to force calling modem 180 to select analog mode. In a third method, the calling modem and the answer modem operate in different modes. Under this method if the answer modem can not support a 28,800 bps data rate the connection is terminated.

2. Data Mode Spoofing

The jitter buffer 208 may underflow during long packet delivery delay. The jitter buffer 208 underflow can cause the data pump transmitter 210 to run out of data, so that the jitter buffer 208 must be spoofed with bit sequences. Preferably the bit sequences are benign in most applications. While transmitting start-stop characters in accordance with V.14 recommendations, the spoofing logic 214 checks for character format and boundary (number of data bits, start bits and stop bits) within the jitter buffer 208. The spoofing logic 214 must account for stop bits omitted due to asynchronous-to-synchronous conversion. Once the spoofing logic 214 locates character boundary, ones can be added to spoof the remote modem and keep it in the mark state. The length of time a modem can be spoofed with ones depends only upon the application program driving the user modem.

While in error correction mode the spoofing logic 214 checks for HDLC flag (HDLC frame boundary) within the jitter buffer 208. The jitter buffer 208 should be sufficiently large to guarantee that at least one complete HDLC frame is contained within the jitter buffer 208. The default length of an HDLC information frame is 132 octets. The V.42 recommendations for error correction of data circuit terminating equipment (DCE) using asynchronous-to-synchronous conversion does not specify a maximum length for an HDLC information frame. However, because the length of the information frame affects the overall memory required to implement the protocol, a information frame length larger than 260 octets is unlikely.

The spoofing logic 214 stores a threshold water mark (with a value set to be approximately equal to the maximum length of an HDLC information frame). The spoofing logic 214 searches for HDLC flags (0111110 bit sequence) within the jitter buffer 208 when the amount of data signal stored within the jitter buffer 208 falls below the threshold level. When the HDLC is about to be sent, the spoofing logic 214 begins to insert HDLC flags into the jitter buffer 208, and continues until the amount of data signal within the jitter buffer 208 is greater than the threshold level.

3. Retrain and Rate Renegotiation

When a retrain occurs, an indication should be forwarded to the network gateway at the end of the packet based network. The network gateway receiving a retrain indication should initiate retrain with the connected modem to keep data flow in synchronism between the two connections. Rate synchronization procedures as previously described should be used to maintain data rate alignment after retrains.

Similarly, rate renegotiation causes both the calling and answer network gateways and to perform rate renegotiation. However, rate signals or MP (CP) sequences should be exchanged per method two of the data rate alignment as previously discussed for a V.32bis or V.34 rate synchronization whichever is appropriate.

4. Error Correcting Mode Synchronization

Error control (V.42) and data compression (V.42bis) modes should be synchronized at each end of the packet based network by one of two alternate methods. In the first method, the calling modem and the answer modem independently negotiate modes on their own, transparent to the modem network gateways. This method is preferred for connections wherein the network delay plus jitter is relatively small, as characterized by an overall round trip delay of less than 700 msec.

In an alternate method, the error control synchronizers 222 operating with the network gateways force the user modems out of LAPM mode into a non-error correcting protocol (V.14). Preferably, the error correction synchronizer 222 operating under the packet data modem exchange 54 in the calling network gateway waits a period of time (about 650 msec.) for an error correction mode indication from the opposite end of the network. If an indication arrives, then the first method is used. If not, the error correction synchronizer 222 operating under the packet data modem exchange in the calling network gateway responds with an ADP followed by HDLC flags. The HDLC flags spoof the calling modem until the an error correction mode indication arrives. If mode indication is received before timeout, which indicates error control mode, then unnumbered acknowledgment (UA) response is sent to the calling modem and the calling network gateway proceeds with an error control connection.

The V.42 recommendation does not specify the length of time HDLC flags will be accepted before the calling modem timeouts. Therefore, empirical tests should be performed to determine how long the calling modem within a particular implementation can be spoofed in this manner.

Alternatively, if the calling network gateway receives mode indication indicating V.14 or a timeout has occurred, the calling network gateway issues a disconnect mode (DM) response to indicate exit from V.42. The calling modem should then revert to non-error control mode.

Data compression mode is negotiated within V.42 so that the appropriate mode indication can be relayed when the calling and answer modems have entered into V.42 mode.

A third mode is to allow modems at both ends to freely negotiate the error control mode with their respective network gateways. The network gateways must filly support all error correction modes when using this method. Also, because of flow control issues, this method cannot support the scenario where one modem selects V.14 while the other modem selects a mode other than V.14. For the case where V.14 is negotiated at both sides of the packet based network, the 8-bit no parity format is assumed and the raw demodulated data bits are transported between the network gateways. With all other cases, each gateway shall extract the de-framed (error corrected) data bits and forwards them to its counterpart at the opposite end of the network. Flow control procedures within the error control protocol can be used to handle network delay. The advantage of this method over the first method is its ability to handle large network delays and also the scenario where the local connection rates at the network gateways are different. However, packets transported over the network in accordance with this method must be guaranteed to be error free.

Although a preferred embodiment of the present invention has been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A communications system, comprising:
   a first rate negotiator configured to negotiate a data rate with a first telephony device over a first network line, and renegotiate the negotiated data rate with a second rate negotiator coupled to a remote system over a second network line, the remote system comprising a second telephony device, wherein the first rate negotiator and the second rate negotiator communicate over a packet based network; and
   a data exchange configured to exchange data signals between the first telephony device and the remote system over the packet based network at the renegotiated data rate.

2. The communications system of claim 1 wherein the data exchange comprises a data pump configured to demodulate the data signals from the first telephony device for transmission over the packet based network to the remote system at the renegotiated data rate, and modulate the data signals from the remote system with a voiceband carrier for transmission over the network line to the first telephony device at the renegotiated data rate.

3. The communications system of claim 1 further comprising a clock synchronizer configured to control the renegotiated data rate of a data pump.

4. The communications system of claim 3 further comprising a jitter buffer configured to buffer the data signals from the packet based network, the control of the renegotiated data rate of the data pump by the clock synchronizer being a function of the buffered data signals.

5. The communications system of claim 4 wherein clock synchronizer is configured to control the renegotiated data rate of the data pump by increasing the renegotiated data rate of the data pump if the buffered data signals exceed a first threshold and decreasing the renegotiated data rate of the data pump if the buffered data signals are below a second threshold.

6. A communications system comprising
a rate negotiator configured to negotiate a data rate with a first telephony device over a network line, and renegotiate the negotiated data rate with a remote system over a packet based network, the remote system comprising a second telephony device;
a data exchange configured to exchange data signals between the first telephony device and the remote system at the renegotiated data rate; and
spoofing logic configured to spoof the first telephony device in response to a delay of the data signals from the remote system.

7. The communications system of claim 6 wherein the spoofing logic is configured to couple spoofing data to a data pump in response to the delay of the data signals from the remote system, the data pump spoofing the first telephony device with the spoofing data.

8. The communications system of claim 6 further comprising a jitter buffer configured to buffer the data signals from the packet based network, the jitter buffer causing the spoofing logic to spoof the first telephony device when the data signals buffered are below a threshold.

9. The communications system of claim 8 wherein the jitter buffer is configured to cause the spoofing logic to couple spoofing data to a data pump when the buffered data signals are below the threshold, the data pump spoofing the first telephony device with the spoofing data.

10. A method of communications, comprising:
negotiating a data rate with a first telephony device over a first network line;
renegotiating the negotiated data rate with a second rate negotiator coupled to a remote system over a second network line, the remote system comprising a second telephony device;
communicating between the first rate negotiator and the second rate negotiator over a packet based network; and
exchanging data signals between the first telephony device and the remote system over the packet based network at the renegotiated data rate.

11. The method of claim 10 wherein the exchange of data signals comprises demodulating the data signals from the first telephony device for transmission over the packet based network to the remote system at the renegotiated data rate, and modulating the data signals from the remote system with a voiceband carrier for transmission over the network line to the first telephony device at the renegotiated data rate.

12. The method of claim 10 further comprising buffering the data signals from the packet based network, the first telephony device being spoofed when the data signals buffered are below a threshold.

13. A method of communications, comprising
negotiating a data rate with a first telephony device over a network line;
renegotiating the negotiated data rate with a remote system over a packet based network, the remote system comprising a second telephony device;
exchanging data signals between the first telephony device and the remote system at the renegotiated data rate; and
spoofing the first telephony device in response to a delay of the data signals from the remote system.

14. The method of claim 13 wherein the first telephony device comprises a facsimile machine.

15. The method of claim 13 further comprising buffering the data signals from the packet based network, and controlling the renegotiated data rate as function of the buffered data signals.

16. The method of claim 15 wherein the control of the renegotiated data rate comprises increasing the renegotiated data rate if the buffered data signals exceed a first threshold and decreasing the renegotiated data rate if the buffered data signals are below a second threshold.

17. The method of claim 13 wherein the first and second telephony devices each comprises a telephone.

18. The method of claim 13 wherein the first and second telephony devices each comprises a facsimile machine.

19. The method of claim 13 wherein the first and second telephony devices each comprises a modem.

20. Computer-readable media embodying a program of instructions executable by a computer to perform a method of communications, the method comprising:
negotiating a data rate with a first telephony device over a first network line;
renegotiating the negotiated data rate with a second rate negotiator coupled to a remote system over a second network line, the remote system comprising a second telephony device;
communicating between the first rate negotiator and the second rate negotiator over a packet based network; and
exchanging data signals between the first telephony device and the remote system over the packet based network at the renegotiated data rate.

21. The computer-readable media of claim 20 wherein the exchange of data signals comprises demodulating the data signals from the first telephony device for transmission over the packet based network to the remote system at the renegotiated data rate, and modulating the data signals from the remote system with a voiceband carrier for transmission over the network line to the first telephony device at the renegotiated data rate.

22. computer-readable media embodying a program of instructions executable by a computer to perform a method of communications, the method comprising:
negotiating a data rate with a first telephony device over a network line;

renegotiating the negotiated data rate with a remote system over a packet based network, the remote system comprising a second telephony device;

exchanging data signals between the first telephony device and the remote system at the renegotiated data rate; and spoofing the first telephony device in response to a delay of the data signals from the remote system.

23. The computer-readable media of claim 22 wherein the method further comprises buffering the data signals from the packet based network, the first telephony device being spoofed when the data signals buffered are below a threshold.

24. The computer-readable media of claim 22 wherein the method further comprises buffering the data signals from the packet based network, and controlling the renegotiated data rate as function of the buffered data signals.

25. The computer-readable media of claim 24 wherein the control of the renegotiated data rate comprises increasing the renegotiated data rate if the buffered data signals exceed a first threshold and decreasing the renegotiated data rate if the buffered data signals are below a second threshold.

* * * * *

UNITED STATES PATENT AND TRADEMARK OFFICE
CERTIFICATE OF CORRECTION

| | |
|---|---|
| PATENT NO. | : 6,882,711 B1 |
| APPLICATION NO. | : 09/454219 |
| DATED | : April 19, 2005 |
| INVENTOR(S) | : Nicol et al. |

It is certified that error appears in the above-identified patent and that said Letters Patent is hereby corrected as shown below:

On the Title Page

(60) Related U.S. Application Data     Delete "No. 60/157,470, filed November 10, 1999", Insert --No. 60/164,689, filed November 10, 1999--

(56) References Cited
U.S. Patent Documents

Insert --4,617,676 A 10/1986 Jayant et al.
       5,339,384 A 08/1994 Chen
       5,452,289 A 09/1995 Sharma, et al.
       5,471,470 A 11/1995 Sharma, et al.
       5,577,041 A 11/1996 Sharma, et al.
       5,600,649 A 02/1997 Sharma, et al.
       5,764,627 A 06/1998 Sharma, et al.
       5,790,532 A 04/1998 Sharma, et al.--

(56) References Cited
OTHER PUBLICATIONS

Insert --International Telecommunication Union, Data Communication Over The Telephone Network, 1200 Bits Per Second Duplex Modem Standardized For Use In The General Switched Telephone Network And On Point-To-Point 2-Wire Leased Telephone-Type Circuits, ITU-T Recommendation V.22, (Extract from the Blue Book)--

(56) References Cited
OTHER PUBLICATIONS

Insert --International Telecommunication Union, Data Communication Over The Telephone Network, 2400 Bits Per Second Duplex Modem Using The Frequency Division Technique Standardized For Use On The General Switched Telephone Network And On Point-To-Point 2-Wire Leased Telephone-Type Circuits, ITU-T Recommendation V.22 bis, (Extract from the Blue Book)--

(56) References Cited
OTHER PUBLICATIONS

Insert --International Telecommunication Union, Data Communication Over The Telephone Network, A Family Of 2-Wire, Duplex Modems Operating At Data Signaling Rates Of Up To 9600 bit/s For Use On The General Switched Telephone Network And On Leased Telephone-Type Circuits, ITU-T Recommendation V.32 (03/93), (Previously "CCITT Recommendation)--

UNITED STATES PATENT AND TRADEMARK OFFICE
CERTIFICATE OF CORRECTION

PATENT NO. : 6,882,711 B1
APPLICATION NO. : 09/454219
DATED : April 19, 2005
INVENTOR(S) : Nicol et al.

Page 2 of 6

It is certified that error appears in the above-identified patent and that said Letters Patent is hereby corrected as shown below:

| | |
|---|---|
| (56) References Cited OTHER PUBLICATIONS | Insert --International Telecommunication Union, Data Communication Over The Telephone Network, A Duplex Modem Operating At Data Signalling Rates Of Up To 14 400 bit/s For Use On The General Switched Telephone Network And On Leased Point-To-Point 2-Wire Telephone-Type Circuits, Recommendation V.32 bis, Geneva, 1991-- |
| (56) References Cited OTHER PUBLICATIONS | Insert --International Telecommunication Union, Data Communication Over The Telephone Network, A Modem Operating At Data Signalling Rates Of Up To 28 800 bit/s For Use On The General Switched Telephone Network And On Leased Point-To-Point 2-Wire Telephone-Type Circuits, ITU-T Recommendation V.34 09/1994 (Previously "CCITT Recommendation")-- |
| (56) References Cited OTHER PUBLICATIONS International Telecommunication Union, CCITT-The International Telegraph and Telephone Consultative... | Delete "A2-Wire", Insert --A 2-Wire-- |
| (56) References Cited OTHER PUBLICATIONS International Telecommunication Union, CCITT-The International Telegraph and Telephone Consultative... | Delete "bit's"", Insert --bit/s"-- |
| (56) References Cited OTHER PUBLICATIONS IEEE; IEEE Standards for Local and Metropolitan Area Networks | Delete "Specifications, Media", Insert --Specifications, "Media-- |

UNITED STATES PATENT AND TRADEMARK OFFICE
CERTIFICATE OF CORRECTION

PATENT NO. : 6,882,711 B1
APPLICATION NO. : 09/454219
DATED : April 19, 2005
INVENTOR(S) : Nicol et al.

It is certified that error appears in the above-identified patent and that said Letters Patent is hereby corrected as shown below:

(56) References Cited
OTHER PUBLICATIONS

Delete "U.S. Appl. No. 09/639,527, Aug. 16, 2000, Jordan James Nicol.
U.S. Appl. No. 09/493,458, filed Jan. 28, 2000, Henry Li.
U.S. Appl. No. 09/643,920, filed Aug. 23, 2000, Onur Tackin et al.
U.S. Appl. No. 09/692,554, filed Oct. 19, 2000, Wilf Le Blanc et al.
U.S. Appl. No. 09/644,586, filed Aug. 23, 2000, Henry Li.
U.S. Appl. No. 09/643,921, filed Aug. 23, 2000, Wilf Le Blanc et al.
U.S. Appl. No. 09/653,261, filed Aug. 31, 2000, Onur Tackin et al.
U.S. Appl. No. 09/654,376, filed Sep. 1, 2000, Onur Tackin.
U.S. Appl. No. 09/533,022, filed Mar. 22, 2000 Wilf Le Blanc et al.
U.S. Appl. No. 09/697,777, filed Oct. 26, 2000, Wilf Le Blanc et al.
U.S. Appl. No. 09/651,006, filed Aug. 29, 2000, Kenny C. Kwan.
U.S. Appl. No. 09/522,184, filed Mar. 9, 2000, Henry Li et al."

UNITED STATES PATENT AND TRADEMARK OFFICE
CERTIFICATE OF CORRECTION

PATENT NO. : 6,882,711 B1
APPLICATION NO. : 09/454219
DATED : April 19, 2005
INVENTOR(S) : Nicol et al.

It is certified that error appears in the above-identified patent and that said Letters Patent is hereby corrected as shown below:

In the Drawings

FIG. 3, Sheet 3 of 14    Delete Drawing Sheet 3 and substitute therefore the Drawing Sheet, consisting of Fig. 3, as shown on the attached page FIG. 13, Sheet 12 of 14    Delete Drawing Sheet 12 and substitute therefore the Drawing Sheet, consisting of Fig. 13, as shown on the attached page

In the Claims

Column 38, line 61, Claim 22    Before "computer-readable media", Insert --A--

Signed and Sealed this

Fifth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 6,882,711 B1
APPLICATION NO. : 09/454219
DATED : April 19, 2005
INVENTOR(S) : Nicol et al.

It is certified that error appears in the above-identified patent and that said Letters Patent is hereby corrected as shown below:

On the Title Page, item

(12) United States Patent　　　　　Delete "Nicol",
Nicol　　　　　　　　　　　　　　Insert --Nicol et al.--

(75) Inventors　　　　　　　　　　After "Vancouver (CA)",
　　　　　　　　　　　　　　　　Insert --;Henry Li, Vancouver (CA);
　　　　　　　　　　　　　　　　David M. Enns, Vancouver (CA);
　　　　　　　　　　　　　　　　Kenny C. Kwan, New Westminster (CA)--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 6,882,711 B1  
APPLICATION NO. : 09/454219  
DATED : April 19, 2005  
INVENTOR(S) : Nicol et al.

Page 1 of 1

It is certified that error appears in the above-identified patent and that said Letters Patent is hereby corrected as shown below:

On the Title Page, item

(12) United States Patent  
Nicol

Delete "Nicol",  
Insert --Nicol et al.--.

(75) Inventors

After "Vancouver (CA)",  
Insert --;Henry Li, Vancouver (CA);  
David M. Enns, Vancouver (CA);  
Kenny C. Kwan, New Westminster (CA);  
Scott Branden, Vancouver (CA)--.

This certificate supersedes the Certificate of Correction issued September 23, 2008.

Signed and Sealed this

Eighteenth Day of November, 2008

JON W. DUDAS  
*Director of the United States Patent and Trademark Office*